US012748638B2

(12) United States Patent
Foley

(10) Patent No.: US 12,748,638 B2
(45) Date of Patent: Sep. 29, 2026

(54) PARALLEL PROCESSING ARCHITECTURE FOR BRANCH PATH SUPPRESSION

(71) Applicant: Ascenium, Inc., Mountain View, CA (US)

(72) Inventor: Peter Foley, Los Altos Hills, CA (US)

(73) Assignee: Ascenium, Inc., Mountain View, CA (US)

( * ) Notice: Subject to any disclaimer, the term of this patent is extended or adjusted under 35 U.S.C. 154(b) by 407 days.

(21) Appl. No.: 18/585,156

(22) Filed: Feb. 23, 2024

(65) Prior Publication Data

US 2024/0193009 A1 Jun. 13, 2024

Related U.S. Application Data

(63) Continuation-in-part of application No. 17/526,003, filed on Nov. 15, 2021, which is a (Continued)

(51) Int. Cl.
*G06F 9/52* (2006.01)

(52) U.S. Cl.
CPC .................................... *G06F 9/52* (2013.01)

(58) Field of Classification Search
CPC .... G06F 9/4881; G06F 9/5016; G06F 9/5027; G06F 8/445; G06F 2209/5017; G06F 9/5038
See application file for complete search history.

(56) References Cited

U.S. PATENT DOCUMENTS

| | | | |
|---|---|---|---|
| 5,594,884 A | 1/1997 | Matoba et al. | |
| 5,764,994 A | 6/1998 | Craft | |

(Continued)

FOREIGN PATENT DOCUMENTS

| | | |
|---|---|---|
| CN | 209388306 U | 9/2019 |
| EP | 1507201 A1 | 2/2005 |

(Continued)

OTHER PUBLICATIONS

Hamzeh et al. ("Branch-Aware Loop Mapping on CGRAs", IEEE) (Year: 2014).*

(Continued)

*Primary Examiner* — Sisley N Kim
(74) *Attorney, Agent, or Firm* — Adams Intellex, PLC

(57) ABSTRACT

Techniques for a parallel processing architecture for branch path suppression are disclosed. An array of compute elements is accessed. Each element is known to a compiler and is coupled to its neighboring elements. Control for the elements is provided on a cycle-by-cycle basis. Control is enabled by a stream of wide control words generated by the compiler. The control includes a branch. A plurality of compute elements is mapped. The mapping distributes parallelized operations to the compute elements. The mapping is determined by the compiler. A column of compute elements is enabled to perform vertical data access suppression and a row of compute elements is enabled to perform horizontal data access suppression. Both sides of the branch are executed. The executing includes making a branch decision. Branch operation data accesses are suppressed, based on the branch decision and an invalid indication. The invalid indication is propagated among compute elements.

25 Claims, 9 Drawing Sheets

Related U.S. Application Data continuation-in-part of application No. 17/465,949, filed on Sep. 3, 2021.

(60) Provisional application No. 63/536,144, filed on Sep. 1, 2023, provisional application No. 63/529,159, filed on Jul. 27, 2023, provisional application No. 63/460,909, filed on Apr. 21, 2023, provisional application No. 63/447,915, filed on Feb. 24, 2023, provisional application No. 63/254,557, filed on Oct. 12, 2021, provisional application No. 63/232,230, filed on Aug. 12, 2021, provisional application No. 63/229,466, filed on Aug. 4, 2021, provisional application No. 63/193,522, filed on May 26, 2021, provisional application No. 63/166,298, filed on Mar. 26, 2021, provisional application No. 63/125,994, filed on Dec. 16, 2020, provisional application No. 63/114,003, filed on Nov. 16, 2020, provisional application No. 63/091,947, filed on Oct. 15, 2020, provisional application No. 63/075,849, filed on Sep. 9, 2020.

(56) References Cited

U.S. PATENT DOCUMENTS

| | | | |
|---|---|---|---|
| 7,636,837 B2 | 12/2009 | Sunayama et al. | |
| 7,840,777 B2 | 11/2010 | Mykland | |
| 8,677,081 B1 | 3/2014 | Wentzlaff et al. | |
| 8,694,978 B1 | 4/2014 | Rus et al. | |
| 8,856,768 B2 | 10/2014 | Mykland | |
| 8,869,123 B2 | 10/2014 | Mykland | |
| 8,949,806 B1 | 2/2015 | Lee et al. | |
| 9,158,544 B2 | 10/2015 | Mykland | |
| 9,304,770 B2 | 4/2016 | Mykland | |
| 9,395,992 B2 | 7/2016 | Doing et al. | |
| 9,424,055 B2 | 8/2016 | Lundvall et al. | |
| 9,473,155 B2 | 10/2016 | Staszewski et al. | |
| 9,477,470 B2 | 10/2016 | Mykland | |
| 9,529,715 B2 | 12/2016 | Kumar et al. | |
| 9,582,277 B2 | 2/2017 | Muff et al. | |
| 9,594,559 B2 | 3/2017 | Fontenot et al. | |
| 9,600,287 B2 | 3/2017 | Gschwind et al. | |
| 9,633,160 B2 | 4/2017 | Mykland | |
| 9,652,238 B2 | 5/2017 | Muff et al. | |
| 9,684,511 B2 | 6/2017 | Shanbhogue et al. | |
| 9,830,164 B2 | 11/2017 | Yazdani | |
| 9,851,969 B2 | 12/2017 | Greiner et al. | |
| 9,886,277 B2 | 2/2018 | Loktyukhin et al. | |
| 9,898,293 B2 | 2/2018 | Whittaker | |
| 9,921,836 B2 | 3/2018 | Kumar et al. | |
| 9,928,062 B2 | 3/2018 | Azagury et al. | |
| 9,934,040 B2 | 4/2018 | Bonanno et al. | |
| 9,971,605 B2 | 5/2018 | Henry et al. | |
| 9,977,674 B2 | 5/2018 | Rupley, II et al. | |
| 9,977,675 B2 | 5/2018 | Nystad | |
| 9,977,679 B2 | 5/2018 | Caulfield et al. | |
| 9,983,882 B2 | 5/2018 | Greiner et al. | |
| 9,983,884 B2 | 5/2018 | Maiyuran et al. | |
| 10,089,277 B2 | 10/2018 | Mykland | |
| 10,540,584 B2 | 1/2020 | McBride et al. | |
| 10,922,146 B1 | 2/2021 | Minkin et al. | |
| 11,163,486 B2 | 11/2021 | Bavishi et al. | |
| 11,347,916 B1 | 5/2022 | Desai et al. | |
| 2002/0174318 A1 | 11/2002 | Studdard et al. | |
| 2004/0111710 A1 | 6/2004 | Chakradhar et al. | |
| 2013/0125097 A1* | 5/2013 | Ebcioglu | G06F 8/4452 717/136 |
| 2013/0326190 A1 | 12/2013 | Chung et al. | |
| 2014/0149657 A1 | 5/2014 | Jakovljevic et al. | |
| 2014/0317383 A1 | 10/2014 | Park et al. | |
| 2015/0186146 A1 | 7/2015 | Kushida et al. | |
| 2016/0246602 A1* | 8/2016 | Radhika | G06F 8/4452 |
| 2016/0313984 A1* | 10/2016 | Meixner | G06F 9/30032 |
| 2018/0225116 A1 | 8/2018 | Henry et al. | |
| 2018/0307980 A1 | 10/2018 | Barik et al. | |
| 2018/0322606 A1 | 11/2018 | Das et al. | |
| 2018/0341493 A1 | 11/2018 | Roy et al. | |
| 2019/0004777 A1 | 1/2019 | Meixner | |
| 2019/0347190 A1 | 11/2019 | Singh | |
| 2019/0369990 A1 | 12/2019 | Doerr et al. | |
| 2020/0026498 A1 | 1/2020 | Sumbul et al. | |
| 2020/0241879 A1 | 7/2020 | Vorbach et al. | |
| 2022/0050624 A1 | 2/2022 | Bavishi et al. | |
| 2022/0066776 A1* | 3/2022 | Stevens | G06F 9/30036 |
| 2022/0075740 A1* | 3/2022 | Foley | G06F 13/1668 |
| 2022/0107812 A1 | 4/2022 | Foley | |
| 2022/0342673 A1* | 10/2022 | Wang | G06F 8/4441 |

FOREIGN PATENT DOCUMENTS

| | | |
|---|---|---|
| KR | 10-2015-0051083 A | 5/2015 |
| WO | WO2011038940 A1 | 4/2011 |
| WO | WO2020252763 A1 | 6/2019 |

OTHER PUBLICATIONS

Musicus, B. R. (1988). The OKI advanced array processor (AAP): Development Software Manual.

International Search Report dated Jun. 26, 2024 for PCT/US2024/016978.

Chang, Kyungwook, and Kiyoung Choi. "Mapping control intensive kernels onto coarse-grained reconfigurable array architecture." 2008 International SoC Design Conference. vol. 1. IEEE, 2008.

* cited by examiner

510

| TIME | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| | CNSA1 | CNSA1 | CNSA1 | CNSA1 | CNSA1 | CNSA1 | CNSA1 | | | | | | | | | | | |
| | | FNS1 | FNS1 | FNS1 | FNS1 | FNS1 | FNS1 | FNS1 | | | | | | | | | | |
| | | | FNS2 | FNS2 | FNS2 | FNS2 | FNS2 | FNS2 | FNS2 | | | | | | | | | |
| | | | | FNS3 | FNS3 | FNS3 | FNS3 | FNS3 | FNS3 | FNS3 | | | | | | | | |
| | | | | | FNS4 | FNS4 | FNS4 | FNS4 | FNS4 | FNS4 | FNS4 | | | | | | | |
| | | | | | | PNS1 | PNS1 | PNS1 | PNS1 | PNS1 | PNS1 | PNS1 | | | | | | |
| | | | | | | | PNS2 | PNS2 | PNS2 | PNS2 | PNS2 | PNS2 | PNS2 | | | | | |
| | | | | | | | IFE1 | PNS3 | PNS3 | PNS3 | PNS3 | PNS3 | PNS3 | PNS3 | | | | |
| | | | | | | | | IFE2 | IFE3 | IFE3 | IFE3 | IFE3 | IFE3 | IFE3 | IFE3 | | | |
| | | | | | | | | IFE1 | IFE2 | STU1 | STU1 | STU1 | STU1 | STU1 | STU1 | STU1 | | |
| | CNSAx | Compute **NEXT_SYMBOL** Addr | | | | | | | IFE1 | IFE2 | STU2 | STU2 | STU2 | STU2 | STU2 | STU2 | STU2 | |
| | FNSx | Fetch **NEXT_SYMBOL** | | | | | | | | IFE1 | IFE2 | STU3 | STU3 | STU3 | STU3 | STU3 | STU3 | STU3 |
| | PNSx | Propagate **NEXT_SYMBOL** to CEs | | | | | | | | | IFE1 | | CEV2 | CEV2 | CEV2 | CEV2 | CEV2 | CEV2 |
| | CEVx | CASE EVal | | | | | | | | | | CEV1 | CEV1 | CEV1 | CEV1 | CEV1 | CEV1 | |
| | IFEx | IF/Else If/Else evals | | | | | | | | | | IFE2 | IFE2 | IFE2 | | | | |
| | STUx | **STate** Update to Column 1 - to allow next CASE eval | | | | | | | | | | IFE1 | IFE1 | | | | | |

500

FIG. 5

PARALLEL PROCESSING ARCHITECTURE FOR BRANCH PATH SUPPRESSION

RELATED APPLICATIONS

This application claims the benefit of U.S. provisional patent applications "Parallel Processing Architecture For Branch Path Suppression" Ser. No. 63/447,915, filed Feb. 24, 2023, "Parallel Processing Hazard Mitigation Avoidance" Ser. No. 63/460,909, filed Apr. 21, 2023, "Parallel Processing Architecture With Block Move Support" Ser. No. 63/529,159, filed Jul. 27, 2023, and "Parallel Processing Architecture With Block Move Backpressure" Ser. No. 63/536,144, filed Sep. 1, 2023.

This application is also a continuation-in-part of U.S. patent application "Highly Parallel Processing Architecture With Compiler" Ser. No. 17/526,003, filed Nov. 15, 2021, which claims the benefit of U.S. provisional patent applications "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, "Parallel Processing Architecture For Atomic Operations" Ser. No. 63/229,466, filed Aug. 4, 2021, "Parallel Processing Architecture With Distributed Register Files" Ser. No. 63/232,230, filed Aug. 12, 2021, and "Load Latency Amelioration Using Bunch Buffers" Ser. No. 63/254,557, filed Oct. 12, 2021.

The U.S. patent application "Highly Parallel Processing Architecture With Compiler" Ser. No. 17/526,003, filed Nov. 15, 2021 is also a continuation-in-part of U.S. patent application "Highly Parallel Processing Architecture With Shallow Pipeline" Ser. No. 17/465,949, filed Sep. 3, 2021, which claims the benefit of U.S. provisional patent applications "Highly Parallel Processing Architecture With Shallow Pipeline" Ser. No. 63/075,849, filed Sep. 9, 2020, "Parallel Processing Architecture With Background Loads" Ser. No. 63/091,947, filed Oct. 15, 2020, "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, Parallel Processing Architecture For Atomic Operations" Ser. No. 63/229,466, filed Aug. 4, 2021, and "Parallel Processing Architecture With Distributed Register Files" Ser. No. 63/232,230, filed Aug. 12, 2021.

Each of the foregoing applications is hereby incorporated by reference in its entirety.

FIELD OF ART

This application relates generally to parallel processing and more particularly to a parallel processing architecture for branch path suppression.

BACKGROUND

Organizations thrive or perish based on their data, so effective data processing enables organizational operations. Effective data processing handles large, diverse, and at times unstructured datasets. The processing supports commercial, educational, governmental, medical, research, or retail organizations, and forensic or law enforcement purposes. The organizations range in size from sole proprietor operations to large, international organizations. Computational resources are purchased, configured, deployed, and maintained by the organizations to meet processing needs. The resources include processors, data storage units, networking and communications equipment, telephony, power conditioning units, HVAC equipment, and backup power units, among other essential equipment. Computational resources consume prodigious amounts of energy and produce copious heat, making energy resource management critical. The computational resources can be housed in special-purpose installations that are frequently high security. These installations can resemble high-security bases or even vaults rather than traditional office buildings. Not every organization requires vast computational equipment installations, but all strive to provide resources to meet their data processing needs.

The computational resource installations process data, typically 24×7×365. The types of data processed derive from the organizational missions. The organizations execute large numbers of a wide variety of processing jobs. The processing jobs include running billing and payroll, generating profit and loss statements, processing tax returns or election results, controlling experiments, analyzing research data, and generating grades, among others. These processing jobs must be executed quickly, accurately, and cost-effectively. The processed datasets can be very large, thereby straining the computational resources. Further, the datasets can be unstructured. As a result, processing an entire dataset may be required to find a particular data element. Effective processing of a dataset can be a boon for an organization by quickly identifying potential customers, or by fine tuning production and distribution systems, among other results that yield a competitive advantage to the organization. Ineffective processing wastes money by losing sales or failing to streamline a process, thereby increasing costs to the organization.

Organizations implement a wide variety of data collection techniques in order to collect their data. The data is collected from various and diverse categories of individuals Legitimate data collection techniques include "opt-in" strategies, where an individual signs up, creates an account, registers, or otherwise actively and willingly agrees to participate in the data collection. Some techniques are legislative, where citizens are required by a government to obtain a registration number and to set up an account to interact with government agencies, law enforcement, emergency services, and others. Still other data collection techniques are more subtle or are even completely hidden, such as tracking purchase histories, website visits to various websites, button clicks, and menu choices. At other times, the individuals are unwitting subjects of data collection. Data can and has been collected by theft. Irrespective of the techniques used for the data collection, the collected data is highly valuable to the organizations if it is processed rapidly and accurately.

SUMMARY

Organizations routinely process vast collections of data called datasets. The data processing, when done correctly, is performed to achieve principal organizational goals, missions, and objectives. The datasets are processed by submitting "jobs", where the processing jobs include loading data from storage, manipulating or processing the data using processors, and storing the manipulated data to storage, among many other operations. Common data processing jobs performed by an organization include generating invoices for accounts receivable; processing payments for accounts payable; running payroll for full time, part time, and contracted employees; accounting for income and operational costs; analyzing research data; or training a neural network for machine learning. These processing jobs include tasks that are highly complex and computationally intensive. The tasks can include loading and storing various datasets, accessing processing elements and systems, executing data processing on the processing elements and systems, and so on. The tasks themselves include multiple steps or subtasks, which themselves can be highly complex. The subtasks can be used to handle specific operations such as loading or reading certain datasets from storage, performing arithmetic and logical computations and other data manipulations, storing or writing processed data back to storage, handling inter-subtask communication such as data transfers and control, and so on. The accessed datasets are vast and easily saturate processing architectures that are either ill-suited to the processing tasks or based on inflexible architectures. Instead, arrays of elements are used to process the tasks and subtasks, thereby significantly improving task processing efficiency and throughput. The arrays of elements include compute elements, multiplier elements, registers, caches, buffers, controllers, decompressors, arithmetic logic units (ALUs), storage elements, and other components which can communicate among themselves.

Parallel processing is accomplished based on a parallel processing architecture for branch path suppression. An array of compute elements is accessed, wherein each compute element within the array of compute elements is known to a compiler and is coupled to its neighboring compute elements within the array of compute elements. Control for the compute elements is provided on a cycle-by-cycle basis, wherein the control is enabled by a stream of wide control words generated by the compiler, and wherein the control includes a branch. A plurality of compute elements is mapped within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression. Both sides of the branch are executed in the array of compute elements, wherein the executing includes making a branch decision. Data accesses produced by a branch operation are suppressed, based on the branch decision and an invalid indication, wherein the invalid indication is propagated among two or more of the compute elements.

A processor-implemented method for parallel processing is disclosed comprising: accessing an array of compute elements, wherein each compute element within the array of compute elements is known to a compiler and is coupled to its neighboring compute elements within the array of compute elements; providing control for the array of compute elements on a cycle-by-cycle basis, wherein the control is enabled by a stream of wide control words generated by the compiler, and wherein the control includes a branch; mapping a plurality of compute elements within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression; executing both sides of the branch in the array of compute elements, wherein the executing includes making a branch decision; and suppressing data accesses produced by a branch operation, based on the branch decision and an invalid indication, wherein the invalid indication is propagated among two or more of the compute elements. In embodiments, the mapping includes at least one column of compute elements and one row of compute elements for each simultaneous data access, based on the compiler. In embodiments, the branch is part of a looping operation. And in embodiments, the looping operation comprises operations compiled for a pointer chasing software routine.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 5 is an infographic showing spatial and temporal mapping.

DETAILED DESCRIPTION

Figure 1:
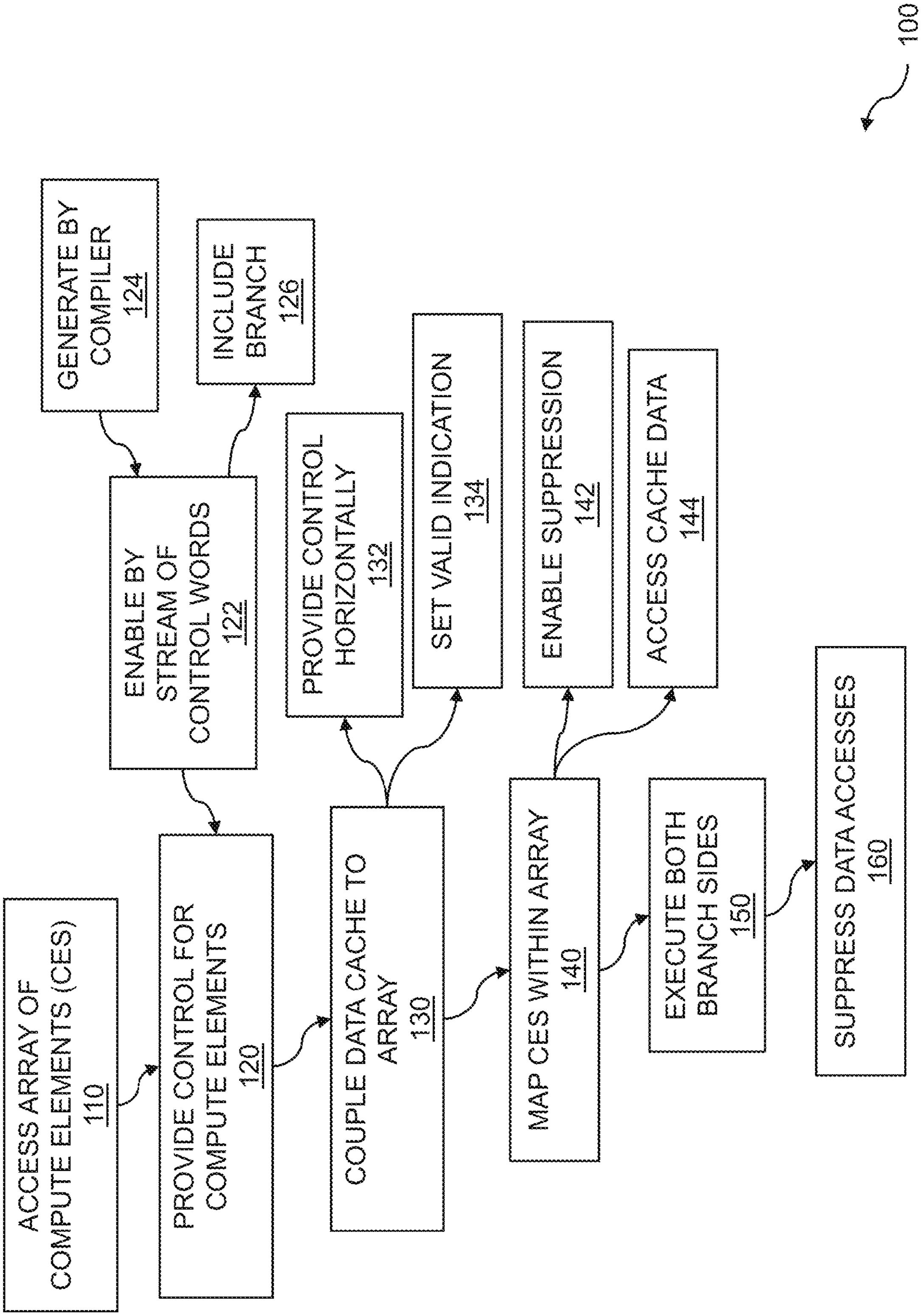
FIG. 1 is a flow diagram for a parallel processing architecture for branch path suppression.

An array of compute elements is configured and operated by providing control to the array of elements on a cycle-by-cycle basis, where a cycle includes an architectural cycle. The control of the array is accomplished by providing control words generated by a compiler. The control words comprise one or more operations that are executed by the array elements. The control includes a stream of control words, where the control words can include wide control words generated by the compiler. The control words are used to initialize the array, to control the flow or transfer of data, and to manage the processing of the tasks and subtasks. The compiler provides static scheduling for the array of compute elements in order to configure the array. Further, the arrays can be configured in a topology which is best suited to the parallel processing. The topologies into which the arrays can be configured include a systolic, a vector, a cyclic, a spatial, a streaming, or a Very Long Instruction Word (VLIW) topology, among others. The topologies can include a topology that enables machine learning functionality. The control words can be compressed to reduce control word storage requirements.

A plurality of compute elements within the array of compute elements is mapped. The plurality of compute elements can include pairs or quads of compute elements, regions or quadrants of the array of compute elements, and so on. The mapping, which is determined by the compiler, distributes parallelized operations to the plurality of compute elements. The parallelized operations are associated with two or more sides of a branch operation. The mappings can enable suppression of operations such as data access operations. A column of compute elements within the plurality of compute elements is enabled to perform vertical data access suppression, and a row of compute elements is enabled to perform horizontal data access suppression. Vertical data access suppression can be associated with a sequence of operations; horizontal data access suppression can be associated with parallel operations; etc. The operations include arithmetic, logical, and data transfer operations, etc. The mapping is based on one or more control words from the stream of control words. The operations are executed in parallel within a cycle such as an architectural cycle.

Two or more sides of the branch operation are executed in the array of compute elements. The number of sides of the branch operations that are executed is based on the number of branch paths associated with the branch operation. The sides of the branch operation are executed substantially in parallel. In addition to executing the sides of the branch, the executing includes making a branch decision. The branch decision is based on evaluating a branch expression where the branch expression can include an arithmetic expression, a logical expression, and so on. The branch decision is used to determine which branch path will be perused. The remaining one or more branch paths include "untaken" paths. The untaken paths can be terminated, flushed, etc. Recall that prior to the branch decision being determined, each path or side of the branch operation is being executed. The operations associated with each path that is being executed can include memory access operations. Once the branch decision is made, then memory access operations associated with the untaken path or paths are no longer needed. Data accesses, produced by a branch operation, that are associated with the untaken paths, are suppressed. The suppression of the data accesses is based on the branch decision and an invalid indication. The invalid indication can include a bit, a flag, a signal, etc.

Techniques for a parallel processing architecture for branch path suppression are disclosed. Sides of a branch operation can be executed in parallel while a branch decision is being made. The executing is accomplished by mapping a plurality of compute elements within the array of compute elements. The mapping is determined by a compiler at compile time. The mapping the compute elements can include configuring and scheduling the compute elements to execute operations associated with the sides of the branch. The mapping distributes parallelized operations to the plurality of compute elements. The distributed parallelized operations can enable the parallel execution of the sides of the branch operation. The mapping further includes a column of compute elements within the plurality of compute elements which is enabled to perform vertical data access suppression, and a row of compute elements which is enabled to perform horizontal data access suppression. The data access suppression can prevent data accesses from being executed and can prevent the data accesses from leaving the array of compute elements. The branch decision determines which branch path or branch side to take based on evaluating an expression. The expression can include a logical expression, a mathematical expression, and so on. When the branch decision is determined, the selected branch side can continue executing while other sides of the branch can be suspended, halted, and the like. Since the operations associated with each side of the branch can include data access operations, data access operations associated with each side can be pending when the branch decision is determined or made. Data access operations associated with the untaken branch sides can be suppressed. The data access suppressing can be based the branch decision and an invalid indication. The invalid indication can be based on a bit, a flag, a semaphore, a signal, etc.

Wide control words that are generated by a compiler are provided to the array. The wide control words are used to control elements within an array of compute elements on a cycle-by-cycle basis. A plurality of compute elements within the array of compute elements is initialized based on a control word from the stream of control words. The control that is provided by the wide control words includes a branch operation. The branch operation such as a conditional branch operation can include an expression and two or more paths or sides. The plurality of compute elements is mapped, where the mapping distributes parallelized operations to the plurality of compute elements. The parallelized operations enable parallel execution of the sides of the branch operation. The parallelized operations can include primitive operations that can be executed in parallel. A primitive operation can include an arithmetic operation, a logical operation, a data handling operation, and so on. The mapping in each element of the plurality of compute elements can include a spatially adjacent mapping. The spatial adjacency can include pairs and quads of compute elements, regions and quadrants of compute elements, and so on. The spatially adjacent mapping comprises an M×N subarray of the array of compute elements. The primitive operations associated with the branch operations can be mapped into some or all of the compute elements. Unmapped compute elements within the M×N array can be initialized for operations unassociated with the branch operation. The spatially adjacent mapping is determined at compile time by the compiler.

In order for tasks, subtasks, and so on to execute properly, particularly in a statically scheduled architecture such as an array of compute elements, one or more operations associated with the plurality of wide control words must be executed in a semantically correct operations order. That is, the data access load and store operations associated with sides of a branch operation and with other operations must occur in an order that supports the execution of the branch, tasks, subtasks, and so on. If the data access load and store operations do not occur in the proper order, then invalid data is loaded, stored, or processed. Another consequence of "out of order" memory access load and store operations is that the execution of the tasks, subtasks, etc., must be halted or suspended until valid data is available, thus increasing execution time. A valid indication can be associated with data access operations to enable hardware ordering of data access loads to the array of compute elements, and data access stores from the array of compute elements. Conversely, an invalid (e.g., not valid) indication associated with data access operations can suppress data access operations. The loads and stores can be controlled locally, in hardware, by one or more control elements associated with or within the array of compute elements. The controlling in hardware is accomplished without compiler involvement beyond the compiler providing the plurality of control words that include precedence information.

Data manipulations are performed on an array of compute elements. The compute elements within the array can be implemented with central processing units (CPUs), graphics processing units (GPUs), application specific integrated circuits (ASICs), field programmable gate arrays (FPGAs), processing cores, or other processing components or combinations of processing components. The compute elements can include heterogeneous processors, homogeneous processors, processor cores within an integrated circuit or chip, etc. The compute elements can be coupled to local storage which can include local memory elements, register files, scratchpad storage, cache storage, etc. The scratchpad storage can serve as a "level 0" (L0) cache. The cache, which can include a hierarchical cache, such as a level 1 (L1), a level 2 (L2), and a level 3 (L3) cache working together, can be used for storing data such as intermediate results, compressed control words, coalesced control words, decompressed control words, relevant portions of a control word, and the like. The cache can store data produced by a taken branch path, where the taken branch path is determined by a branch decision. The decompressed control word is used to control one or more compute elements within the array of compute elements. Multiple layers of the two-dimensional (2D) array of compute elements can be "stacked" to comprise a three-dimensional array of compute elements.

The tasks, subtasks, etc., that are associated with processing operations are generated by a compiler. The compiler can include a general-purpose compiler, a hardware description-based compiler, a compiler written or "tuned" for the array of compute elements, a constraint-based compiler, a satisfiability-based compiler (SAT solver), and so on. Control is provided to the hardware in the form of wide control words on a cycle-by-cycle basis, where one or more control words are generated by the compiler. The control words can include wide microcode control words. The length of a microcode control word can be adjusted by compressing the control word. The compressing can be accomplished by recognizing situations where a compute element is unneeded by a task. Thus, control bits within the control word associated with the unneeded compute elements are not required for that compute element. Other compression techniques can also be applied. The control words can be used to route data, to set up operations to be performed by the compute elements, to idle individual compute elements or rows and/or columns of compute elements, etc. The compiled microcode control words associated with the compute elements are distributed to the compute elements. The compute elements are controlled by a control unit which decompresses the control words. The decompressed control words enable processing by the compute elements. The task processing is enabled by executing the one or more control words. In order to accelerate the execution of tasks, to reduce or eliminate stalling for the array of compute elements, and so on, copies of data can be broadcast to a plurality of physical register files comprising 2R1W memory elements. The register files can be distributed across the 2D array of compute elements.

Parallel processing is accomplished by a parallel processing architecture for branch path suppression. Two or more sides associated with a branch operation can be executed in parallel. The execution of the sides is accomplished by mapping a plurality of compute elements within the array of compute elements. The mapping, which is determined by a compiler, distributes parallelized operations to the plurality of compute elements. The parallelized operations can include one or more operations such as primitive operations. The primitive operations can be executed in parallel. An array of compute elements is accessed. The compute elements can include computation elements, processors, or cores within an integrated circuit; processors or cores within an application specific integrated circuit (ASIC); cores programmed within a programmable device such as a field programmable gate array (FPGA); and so on. The compute elements can include homogeneous or heterogeneous processors. Each compute element within the array of compute elements is known to a compiler. The compiler, which can include a general-purpose compiler, a hardware-oriented compiler, or a compiler specific to the compute elements, can compile code for execution on the compute elements. Each compute element is coupled to its neighboring compute elements within the array of compute elements. The coupling of the compute elements enables data communication between and among compute elements. Thus, the compiler can control data flow between and among the compute elements and can also control data commitment to memory outside of the array.

Control for the compute elements is provided on a cycle-by-cycle basis. A cycle can include a clock cycle, an architectural cycle, a system cycle, etc. The control is enabled by a stream of wide control words generated by the compiler. The control words can configure compute elements within an array of compute elements. The control can include a branch operation. A plurality of compute elements within the array of compute elements is mapped. The mapping distributes parallelized operations to the plurality of compute elements. The parallelized operations can include primitive operations. The mapping is determined by the compiler at compile time. The compiler can include a general-purpose compiler, a hardware description language compiler, a specialized compiler, etc. A column of compute elements within the plurality of compute elements is enabled to perform vertical data access suppression and a row of compute elements is enabled to perform horizontal data access suppression. The suppressing can suppress data access operations originating in any of the compute elements within the enabled column and enabled row. Both sides of the branch are executed in the array of compute elements. The executing both sides of the branch can occur in parallel. The executing includes making a branch decision. The branch decision determines which side of the branch is the taken or true side and which side or sides of the branch are the untaken or false side or sides. Data accesses produced by a branch operation are suppressed, based on the branch decision and an invalid indication. The invalid indication can include a bit, a flag, a signal, and the like. The invalid indication is propagated among two or more of the compute elements. The compute elements to which the invalid indication can be propagated can include the compute elements within the enabled column and the compute elements within the enabled row.

FIG. 1 is a flow diagram for a parallel processing architecture for branch path suppression. Groupings of compute elements (CEs), such as CEs assembled within an array of CEs, can be configured or mapped to execute a variety of operations associated with parallel processing. The operations can be based on tasks, and on subtasks that are associated with the tasks. The array can interface with further elements such as controller units, storage elements, ALUs, memory management units (MMUs), GPUs, multiplier elements, and so on. The operations can accomplish a variety of processing objectives such as application processing, data manipulation, data analysis, artificial intelligence, and so on. The operations can manipulate a variety of data types including integer, real, floating-point, and character data types; vectors and matrices; tensors; etc. Control is provided to the array of compute elements on a cycle-by-cycle basis, where the control is based on wide control words generated by a compiler. The control words, which can include microcode control words, enable or idle various compute elements; provide data; route results between or among CEs, caches, and storage; and the like. The control enables compute element operation, memory access suppression, etc. Compute element operation and memory access suppression enable the hardware to properly sequence and enable data access and compute element results. The control enables execution of a compiled program on the array of compute elements.

The flow 100 includes accessing an array 110 of compute elements, wherein each compute element within the array of compute elements is known to a compiler and is coupled to its neighboring compute elements within the array of compute elements. The compute elements can be based on a variety of types of processors. The compute elements or CEs can include central processing units (CPUs), graphics processing units (GPUs), processors or processing cores within application specific integrated circuits (ASICs), processing cores programmed within field programmable gate arrays (FPGAs), and so on. In embodiments, compute elements within the array of compute elements have identical functionality. The compute elements can be arranged in pairs, quads, and so on, and can share resources within the arrangement. The compute elements can include heterogeneous compute resources, where the heterogeneous compute resources may or may not be colocated within a single integrated circuit or chip. The compute elements can be configured in a topology, where the topology can be built into the array, programmed or configured within the array, etc. In embodiments, the array of compute elements is configured by a control word that can implement a topology. The topology that can be implemented can include one or more of a systolic, a vector, a cyclic, a spatial, a streaming, or a Very Long Instruction Word (VLIW) topology. In embodiments, the array of compute elements can include a two-dimensional (2D) array of compute elements. More than one 2D array of compute elements can be accessed. Two or more arrays of compute elements can be colocated on an integrated circuit or chip, on multiple chips, and the like. In embodiments, two or more arrays of compute elements can be stacked to form a three-dimensional (3D) array. The stacking of the arrays of compute elements can be accomplished using a variety of techniques. In embodiments, the three-dimensional (3D) array can be physically stacked. The 3D array can comprise a 3D integrated circuit. In other embodiments, the three-dimensional array is logically stacked. The logical stacking can include configuring two or more arrays of compute elements to operate as if they were physically stacked.

The compute elements can further include a topology suited to machine learning computation. A topology for machine learning can include supervised learning, unsupervised learning, reinforcement learning, and other machine learning topologies. A topology for machine learning can include an artificial neural network topology. The compute elements can be coupled to other elements within the array of CEs. In embodiments, the coupling of the compute elements can enable one or more further topologies. The other elements to which the CEs can be coupled can include storage elements such as a scratchpad memory, one or more levels of cache storage, control units, multiplier units, address generator units for generating load (LD) and store (ST) addresses, buffers, register files, and so on. The compiler to which each compute element is known can include a C, C++, or Python compiler. The compiler to which each compute element is known can include a compiler written especially for the array of compute elements. The coupling of each CE to its neighboring CEs enables clustering of compute resources; sharing of array elements such as cache elements, multiplier elements, ALU elements, or control elements; communication between or among neighboring CEs; and the like.

The flow 100 includes providing control 120 for the compute elements on a cycle-by-cycle basis. The controlling the array can include configuration of elements such as compute elements within the array; loading and storing data; routing data to, from, and among compute elements; and so on. A cycle can include a clock cycle, an architectural cycle, a system cycle, a self-timed cycle, and the like. In the flow 100, the control is enabled by a stream of control words 122 generated and provided by the compiler 124. The control words can include microcode control words, compressed control words, encoded control words, and the like. The "wideness" or width of the control words allows a plurality of compute elements within the array of compute elements to be controlled by a single wide control word. For example, an entire row of compute elements can be controlled by that wide control word. In embodiments, the stream of wide control words can include variable length control words generated by the compiler. The control words can be decompressed, used, etc., to configure the compute elements and other elements within the array; to enable or disable individual compute elements, rows and/or columns of compute elements; to load and store data; to route data to, from, and among compute elements; and so on. In other embodiments, the stream of wide control words generated by the compiler can provide direct, fine-grained control of the array of compute elements. The fine-grained control of the compute elements can include enabling or idling individual compute elements; enabling or idling rows or columns of compute elements; etc.

In the flow 100, the control includes a branch 126. A branch instruction can include an unconditional branch, a conditional branch, a switch, and so on. For the discussion herein, the branch can include a conditional branch. The condition associated with the branch can be based on evaluating an expression. The expression can include an arithmetic expression, a logical expression, and the like. The arithmetic expression can include multiplication, division, addition, and subtraction. The arithmetic expression can include an inequality such as less than, less than or equal to, greater than, greater than or equal to, etc. The logical expression can include logical operations such as AND, OR, NAND, NOR, XOR, XNOR, NOT, and so on. The logical expression can also include SHIFT such as logical shift and arithmetic shift, ROTATE, etc. The branch can further include two or paths or sides. The sides can include a side taken if the expression evaluates to a desired value, if the expression evaluates to "true" etc. The sides can further include one or more untaken sides. In a usage example, a branch expression can evaluate whether A=B. If A=B, then the "true" side of the branch is taken. If A #B, then the "false" side of the branch is taken.

Data processing that can be performed by the array of compute elements can be accomplished by executing tasks, subtasks, and so on. The tasks and subtasks can be represented by control words, where the control words configure and control compute elements within the array of compute elements. The control words comprise one or more operations, where the operations can include data load and store operations; data manipulation operations such as arithmetic, logical, matrix, and tensor operations; and so on. The control words can be compressed by the compiler, by a compressor, and the like. The plurality of wide control words enables compute element operations. Compute element operations can include arithmetic operations such as addition, subtraction, multiplication, and division; logical operations such as AND, OR, NAND, NOR, XOR, XNOR, and NOT; matrix operations such as dot product and cross product operations; tensor operations such as tensor product, inner tensor product, and outer tensor product; etc. The control words can comprise one or more fields. The fields can include one or more of an operation, a tag, data, and so on. In embodiments, a field of a control word in the plurality of control words can signify a "repeat last operation" control word. The repeat last operation control word can include a number of operations to repeat, a number of times to repeat the operations, etc. The plurality of control words enables compute element memory access. Memory access can include access to local storage such as one or more register files or scratchpad storage, memory coupled to a compute element, storage shared by two or more compute elements, cache memory such as level 1 (L1), level 2 (L2), and level 3 (L3) cache memory, a memory system, etc. The memory access can include loading data, storing data, and the like.

In embodiments, the array of compute elements can be controlled on a cycle-by-cycle basis. The controlling the array can include configuration of elements such as compute elements within the array; loading and storing data; routing data to, from, and among compute elements; and so on. A cycle can include a clock cycle, an architectural cycle, a system cycle, a self-timed cycle, and the like. In embodiments, the stream of control words can include compressed control words, variable length control words, etc. The control words can further include wide compressed control words. The control words can be provided as a stream of control words to the array. The control words can include microcode control words, compressed control words, encoded control words, and the like. The width of the control words allows a plurality of compute elements within the array of compute elements to be controlled by a single wide control word. For example, an entire row of compute elements can be controlled by that wide control word. The control words can be decompressed, used, etc., to configure the compute elements and other elements within the array; to enable or disable individual compute elements, rows and/or columns of compute elements; to load and store data; to route data to, from, and among compute elements; and so on.

Various types of compilers can be used to generate the stream of wide control words. The compiler which generates the wide control words can include a general-purpose compiler such as a C, C++, Java, or Python compiler; a hardware description language compiler such as a VHDL or Verilog compiler; a compiler written for the array of compute elements; and the like. In embodiments, the control words comprise compressed control words, variable length control words, and the like. In embodiments, the stream of control words generated by the compiler can provide direct fine-grained control of the 2D array of compute elements. The compiler can be used to map functionality to the array of compute elements. In embodiments, the compiler can map machine learning functionality to the array of compute elements. The machine learning can be based on a machine learning (ML) network, a deep learning (DL) network, a support vector machine (SVM), etc. In embodiments, the machine learning functionality can include a neural network (NN) implementation. The neural network implementation can include a plurality of layers, where the layers can include one or more of input layers, hidden layers, output layers, and the like. A control word generated by the compiler can be used to configure one or more CEs, to enable data to flow to or from the CE, to configure the CE to perform an operation, and so on. Depending on the type and size of a task that is compiled to control the array of compute elements, one or more of the CEs can be controlled, while other CEs are unneeded by the particular task. A CE that is unneeded can be marked in the control word as unneeded. An unneeded CE requires no data and no control word. In embodiments, the unneeded compute element can be controlled by a single bit. In other embodiments, a single bit can control an entire row of CEs by instructing hardware to generate idle signals for each CE in the row. The single bit can be set for "unneeded", reset for "needed", or set for a similar usage of the bit to indicate when a particular CE is unneeded by a task.

The stream of wide control words that is generated by the compiler can include a conditionality such as a branch. The branch can include a conditional branch, an unconditional branch, etc. Compressed control words can be a decompressed by a decompressor logic block that decompresses words from a compressed control word cache on their way to the array. In embodiments, a set of operations associated with one or more compressed control words can include a spatial allocation of subtasks on one or more compute elements within the array of compute elements. In other embodiments, the set of operations can enable multiple, simultaneous programming loop instances circulating within the array of compute elements. The multiple programming loop instances can include multiple instances of the same programming loop, multiple programming loops, etc.

The flow 100 further includes coupling a data cache 130 to the array of compute elements. The data cache can include a single-level cache, a multilevel cache, a shared cache, a common cache, and the like. The cache can comprise a small, fast memory. The multilevel cache can include increasingly larger, slower memory such as a level 1 (L1) cache comprising the smallest and fastest level; a level 2 (L2) cache being larger and slower than L1; a level 3 (L3) cache being larger and slower than L2 and L1 cache; etc. In embodiments, the data cache can be coupled to the array of compute elements in a vertical direction. The data cache can be coupled directly to the array of compute elements, coupled to one or more additional elements and the array of compute elements, and the like. The one or more additional elements can include one or more buffers such as an access buffer or load buffer, a switch such as a crossbar switch, and so on. In embodiments, a row of compute elements can include a horizontal row of compute elements that receives state information along a horizontal axis. In the flow 100, state information received along the horizontal axis provides control 132. The control can include broadcasting a value; enabling or disabling compute elements; suspending, halting, or suppressing operations by the compute elements; etc. In embodiments, compute elements in the horizontal row of compute elements can communicate in both horizontal directions. Both horizontal directions can include left and right directions. In other embodiments, the compute elements in the horizontal row of compute elements can propagate an invalid indication across the row. The invalid indication can be used for data access suppression.

In embodiments, a valid indication can accompany each data access address that emerges from the array of compute elements. The valid indication can include a valid bit, a valid data tag, a valid address tag, a nonzero address, a valid signal, and so on. In embodiments, each data access address emerging from the array of compute elements can represent a potential load or store operation. Each data access address emerging from the array can further include a complex operation such as a load-modify-store (read-modify-write) operation. In the flow 100, the valid indication is set 134. The valid indication can be set by the compute element that produced a data access request, by a controller such as a control unit, and so on. In embodiments, a valid indication can be a prerequisite for loading and/or storing data in the data cache. Thus, if a valid indication does not accompany a data access request, then that data access request will not be allowed. The data access request can comprise the data and/or address, a load/store indication, and the valid indication. In embodiments, an invalid indication can suppress loading and/or storing data in the data cache (discussed below). A not-valid indication can be accomplished using an invalid indication. In embodiments, the invalid indication is designated by manipulating the valid indication. The invalid indication can include an inverse (e.g., NOT) valid indication, a code that represents the invalid indication, and the like. In embodiments, the invalid indication can include manipulating one or more of a valid bit, a valid data tag, a valid address tag, a nonzero address, and a valid signal.

The flow 100 includes mapping 140 a plurality of compute elements within the array of compute elements. The mapping can include assigning and configuring compute elements within the array of compute elements. In embodiments, mapping is determined by the compiler. Discussed previously, the compiler can include a high-level compiler, a general-purpose, a hardware description language compiler, a compiler configured to the array of compute elements, etc. The mapping can distribute operations to the compute elements. The operations can be associated with a task, a subtask, and the like. In embodiments, the mapping can include at least one column of compute elements and one row of compute elements for each simultaneous data access, based on the compiler. The at least one row of compute elements can represent sides of a branch operation. The at least one column of compute elements can represent a sequence of operations with each side of the branch operation. In embodiments, the column of compute elements can include a vertical column of compute elements that can access cache data along a vertical axis. The compute elements within the column of compute elements can communicate among themselves. In embodiments, compute elements in the vertical column of compute elements can communicate in both vertical directions. That is, the compute elements can communicate up and down the column. Control and other signals can be communicated among compute elements within the column. In embodiments, the compute elements in the vertical column of compute elements propagate an invalid indication bit up and down the column. In embodiments, the mapping distributes parallelized operations to the plurality of compute elements. The parallelized operations can be associated with the branch operation. The parallelized operations can be associated with sides of the branch operation. The parallelized operations can be executed in parallel. In a usage example, a branch operation comprises two sides. Prior to the branch decision associated with the branch operation being determined, both sides of the branch operation can be executed in parallel. When the branch decision is made, then the "take" side can proceed and the "untaken" side can be suspended, flushed, halted, etc.

In the flow 100, compute elements are enabled to perform data access suppression 142. The data access suppression can suppress pending data accesses to the data cache. However, data suppression done simultaneously with an access attempt avoids additional synchronization and prevents a valid access from departing the array of compute elements. The data accesses can be produced by the parallelized operations associated with the branch operation. In embodiments, a column of compute elements within the plurality of compute elements can be enabled to perform vertical data access suppression and a row of compute elements can be enabled to perform horizontal data access suppression. Discussed previously and throughout, the suppressing can be accomplished using an invalid indication. The invalid indication can be accomplished by manipulating the valid indication associated with each data access address produced by one or more compute elements within the array of compute elements. The data access suppression can be reset, disabled, and so on. In embodiments, the suppressing can be disabled by resetting the invalid indication. The flow 100 includes accessing data in the data cache 144. The accessing is based on a data access address that can emerge from the array of compute elements. The accessing is further based on a valid indication. The address can be used to access memory, where the memory can include the data cache memory. In a usage example, state decision variables (including branch decisions) will primarily be horizontally broadcast, which would include a decision variable in a case statement. Loads and stores will be suppressed in the vertical direction—not at the CE sourcing the load, but at the edge of the array where the load or store address emerges. While it is possible to suppress the load or store inside the array, that would mean invalidating the load/store address valid signal sourced by a given CE, which may be suboptimal. It can be more efficient to suppress the load/store valid signal at the edge of the array, which thereby covers generation by potentially any compute element within the column.

The flow 100 includes executing both sides of the branch 150 in the array of compute elements, wherein the executing includes making a branch decision. Discussed above, the branch decision can include an expression and two or more sides. The executing the sides of the branch can include executing the parallelized operations that were mapped. The parallelized operations can be associated with both sides of the branch, two or more sides of the branch, etc. The parallelized operations can include primitive operations. The executing both sides of the branch can produce data accesses, where the data accesses can be targeted at the data cache. Execution of parallelized operations can continue while the branch decision is being made. The branch decision can include evaluating the expression associated with the branch operation. The making the branch decision can determine which side of the branch will continue to be executed and which side will not proceed. In embodiments, the branch decision can be made in a compute element within the array of compute elements. The compute element can be used to evaluate the expression associated with the branch. More than one compute element can be used to make the branch decision. In embodiments, the branch decision can be a result of an operation within the compute element. The operation can include an arithmetic operation, a logical operation, a matrix operation, an inequality, etc. In other embodiments, the branch decision can be made as a result of control logic supporting the array of compute elements. The control logic can include standalone logic, a logic unit, and the like. In further embodiments, the branch can be part of a looping operation. The looping operation can be associated with a process, task, subtask, and so on. The looping operation can be associated with a testing or benchmarking operation. In embodiments, the looping operation can include operations compiled for a pointer chasing software routine. The pointer chasing software routine can be part of a benchmarking operation. In embodiments, the pointer chasing software routine can include a cache performance evaluation. The cache performance evaluation can determine cache performance based on different addressing schemes, strides, etc. The cache performance evaluation can further include determining one or more latencies such as cache latency, crossbar switch transit times, bus latency, etc.

The flow 100 includes suppressing data accesses 160 produced by a branch operation, based on the branch decision and an invalid indication, wherein the invalid indication is propagated among two or more of the compute elements. The suppressing can suppress data accesses associated with one or more untaken sides of the branch operation. The suppressing can prevent data accesses, such as data load accesses and data store accesses, from accessing data in the data cache or other memory. The suppressing can further include suppressing data accesses that could occur after termination of a loop operation. The suppressing can suppress broadcasting data across a row of compute elements. The suppressing broadcasting data across a row can cause operations being executed by compute elements in the row of compute elements to suspend, halt, terminate, etc. The suppressing can continue while an invalid indication persists. The invalid indication can be produced by any compute elements within a column of compute elements, a row of compute elements, and so on. In embodiments, the suppressing can be disabled by resetting the invalid indication. The resetting can include manipulating the valid indication, setting the valid indication to a null or undefined (e.g., not yet set) setting, and the like. The resetting can occur when a looping operation terminates, when a plurality of compute elements within the array of compute elements is mapped, etc. Thus, a key capability is to be able to rapidly broadcast important state information to neighboring CEs, both horizontally and vertically, which comprises rapid temporal and spatial communication.

Further embodiments include decompressing a stream of compressed control words. The decompressed control words can comprise one or more operations, where the operations can be executed by one or more compute elements within the array of compute elements. The decompressing the compressed control words can be accomplished using a decompressor element. The decompressor element can be coupled to the array of compute elements. In embodiments, the decompressing by a decompressor operates on compressed control words that can be ordered before they are presented to the array of compute elements. The presented compressed control words that were decompressed can be executed by one or more compute elements. Further embodiments include executing operations within the array of compute elements using the plurality of compressed control words that were decompressed. The executing operations can include configuring compute elements, loading data, processing data, storing data, generating control signals, and so on. The executing the operations within the array can be accomplished using a variety of processing techniques such as sequential execution techniques, parallel processing techniques, etc.

The control words that are generated by the compiler can include a conditionality. In embodiments, the control words include branch operations. Code, which can include code associated with an application such as image processing, audio processing, and so on, can include conditions which can cause execution of a sequence of code to transfer to a different sequence of code. The conditionality can be based on evaluating an expression such as a Boolean or arithmetic expression. In embodiments, the conditionality can determine code jumps. The code jumps can include conditional jumps as just described, or unconditional jumps such as a jump to halt, exit, or terminate instruction. The conditionality can be determined within the array of elements. In embodiments, the conditionality can be established by a control unit. In order to establish conditionality by the control unit, the control unit can operate on a control word provided to the control unit. Further embodiments include suppressing memory access stores for untaken branch paths. In parallel processing techniques, each path or side of a conditionality such as a branch can begin execution prior to the evaluating the conditionality that will decide which path to take. Once the conditionality has been decided, execution of operations associated with the taken path or side can continue. Operations associated with the untaken path can be suspended. Thus, any memory access stores associated with the untaken path can be suppressed because they are no longer relevant. In embodiments, the control unit can operate on decompressed control words. The control words can be a decompressed by a decompressor logic block that decompresses words from a compressed control word cache on their way to the array. In embodiments, the set of directions can include a spatial allocation of subtasks on one or more compute elements within the array of compute elements.

The operations that are executed by the compute elements within the array can include arithmetic operations, logical operations, matrix operations, tensor operations, and so on. The operations that are executed are contained in the control words. Discussed above, the control words can include a stream of wide control words generated by the compiler. The control words can be used to control the array of compute elements on a cycle-by-cycle basis. A cycle can include a local clock cycle, a self-timed cycle, a system cycle, and the like. In embodiments, the executing occurs on an architectural cycle basis. An architectural cycle can include a read-modify-write cycle. In embodiments, the architectural cycle basis reflects non-wall clock, compiler time. The execution can include distributed execution of operations. In embodiments, the distributed execution of operations can occur in two or more compute elements within the array of compute elements, within a grouping of compute elements, and so on. The compute elements can include independent or individual compute elements, clustered compute elements, etc. Execution of specific compute element operations can enable parallel operation processing. The parallel operation processing can include processing nodes of a graph that are independent of each other, processing independent tasks and subtasks, etc. The operations can include arithmetic, logic, array, matrix, tensor, and other operations. A given compute element can be enabled for operation execution, idled for a number of cycles when the compute element is not needed, etc. The operations that are executed can be repeated. An operation can be based on a plurality of control words.

The operation that is being executed can include data dependent operations. In embodiments, the plurality of control words includes two or more data dependent branch operations. The branch operations can include two or more branches, where a branch is selected based on an operation such as an arithmetic or logical operation. In a usage example, a branch operation can determine the outcome of an expression such as A>B. If A is greater than B, then one branch can be taken. If A is less than or equal to B, then another branch can be taken. In order to expedite execution of a branch operation, sides of the branch can be precomputed prior to datum A and datum B being available. When the data is available, the expression can be computed, and the proper branch direction can be chosen. The untaken branch data and operations can be discarded, flushed, etc. In embodiments, the two or more data dependent branch operations can require a balanced number of execution cycles. The balanced number of execution cycles can reduce or eliminate idle cycles, stalling, and the like. In embodiments, the balanced number of execution cycles is determined by the compiler. In embodiments, the generating, the customizing, and the executing can enable background memory access. The background memory access can enable a control element to access memory independently of other compute elements, a controller, etc. In embodiments, the background memory access can reduce load latency. Load latency is reduced since a compute element can access memory before the compute element exhausts the data that the compute element is processing.

The array of compute elements can accomplish an autonomous operation. The autonomous operation can be based on a buffer such as an autonomous operation buffer that can be loaded with an instruction that can be executed using a "fire and forget" technique, where instructions are loaded in the autonomous operation buffer and the instructions can be executed without further supervision by a control word. The autonomous operation of the compute element can be based on operational looping, where the operational looping is enabled without additional control word loading. The looping can be enabled based on ordering memory access operations such that memory access hazards are avoided. Note that latency associated with access by a compute element to storage can be significant and can cause operation of the compute element to stall. A compute element operation counter can be coupled to the autonomous operation buffer. The compute element operation counter can be used to control a number of times that the instructions within the autonomous operation buffer are cycled through. The compute element operation counter can be used to indicate or "point to" the next instruction to be provided to a compute element, a multiplier element, an ALU, or another element within the array of compute elements. In embodiments, the autonomous operation buffer and the compute element operation counter enable compute element operation execution. The compute element operation execution can include executing one or more instructions, looping executions, and the like. In embodiments, the compute element operation execution involves operations not explicitly specified in a control word. Operations not explicitly specified in a control word can include low level operations within the array of compute elements, such as data transfer protocols, execution completion and other signal generation techniques, etc.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
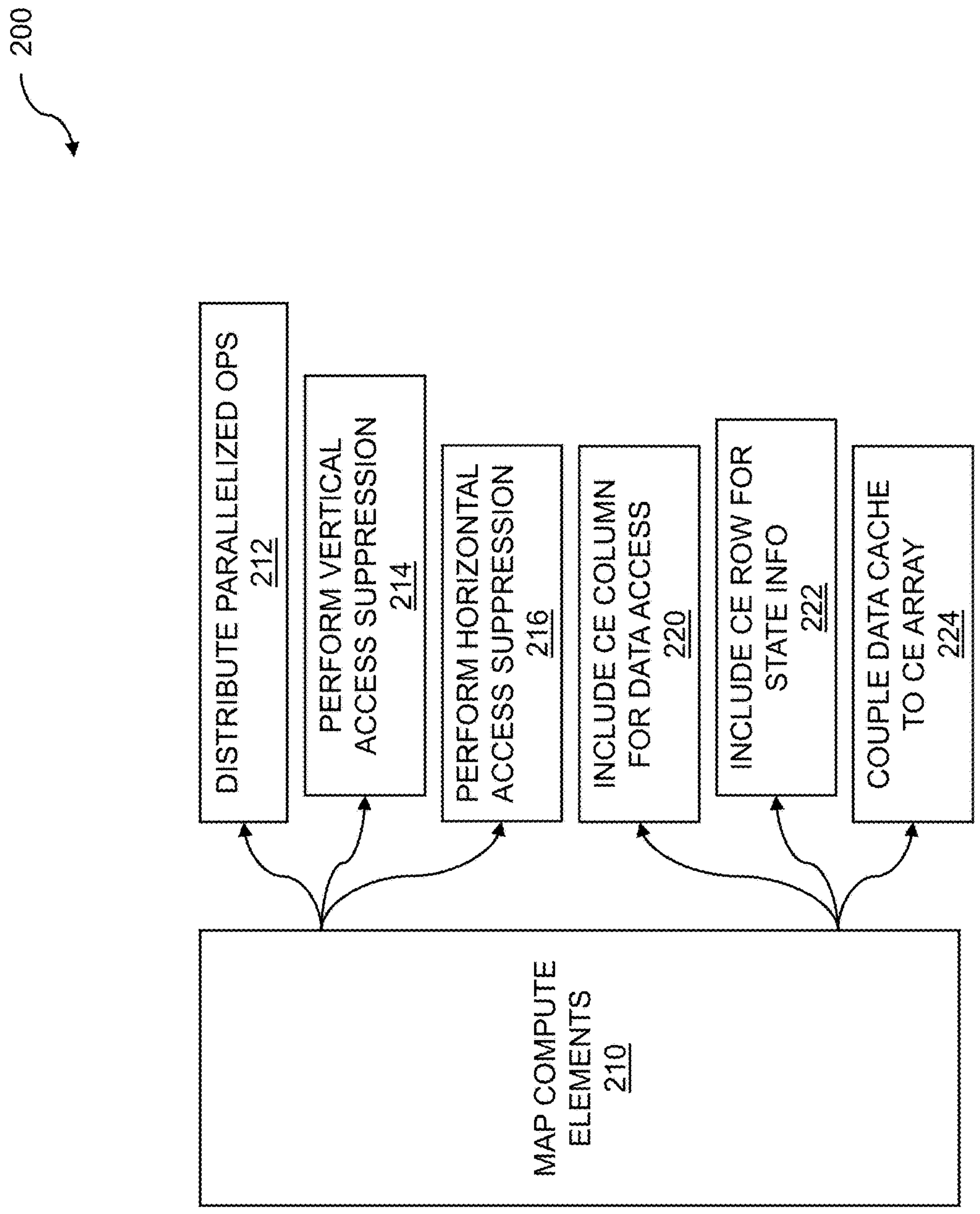
FIG. 2 is a flow diagram for parallel operation distribution.

FIG. 2 is a flow diagram for parallel operation distribution. Processes, tasks, subtasks, and so on can include operations that can be parallelized. When the processes, tasks, subtasks, etc. can be parallelized, the parallel operations can be distributed to a mapped plurality of compute elements. Based on provided control, the compute elements can execute operations in parallel. The operations that are executed can include operations associated with sides of a branch operation. The parallel execution of sides of the branch operation can continue while a branch decision is determined. The branch decision can be based on an expression such as an arithmetic or logical expression. The branch decision can be used to suppress data accesses produced by a branch operation. The suppressed data accesses can be associated with an untaken path or side associated with the branch operation. The parallel operation distribution is enabled by a parallel processing architecture for branch path suppression. An array of compute elements is accessed, wherein each compute element within the array of compute elements is known to a compiler and is coupled to its neighboring compute elements within the array of compute elements. Control is provided for the array of compute elements on a cycle-by-cycle basis, wherein the control is enabled by a stream of wide control words generated by the compiler, and wherein the control includes a branch. A plurality of compute elements is mapped within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression. Both sides of the branch are executed in the array of compute elements, wherein the executing includes making a branch decision. Data accesses produced by a branch operation are suppressed, based on the branch decision and an invalid indication, wherein the invalid indication is propagated among two or more of the compute elements.

The flow 200 includes mapping a plurality of compute elements 210 within an array of compute elements. The compute elements that are mapped can include pairs or quads of compute elements, regions or quadrants of the compute element array, and so on. The mapping can include one or more columns of compute elements, rows of compute elements, etc. The mapping can include distributing operations such as operations associated with a branch operation. In the flow 200, the mapping distributes parallelized operations 212 to the plurality of compute elements. The parallelized operations can be executed on two or more compute elements. The parallelized operations can generate data accesses, where the data accesses can access various types, configurations, and so on, or storage. The storage can include local memory, scratchpad memory, cache memory, multilevel cache memory, shared memory, and so on. In embodiments, the mapping can be determined by the compiler. The compiler can include a high-level compiler, a general-purpose compiler, a hardware description language compiler, a compiler designed for the array of compute elements, etc. The mapping that can be determined by the compiler can be determined at compile time. The mapping can include configuration information for compute elements.

In the flow 200, a column of compute elements within the plurality of compute elements is enabled to perform vertical data access suppression 214. Data access suppression can include suppressing data accesses such as data load accesses and data store accesses. The data accesses can be produced by an operation such as a branch operation. The data accesses can be associated with the parallelized operations. The data accesses can be produced by operations associated with sides of a branch operation. A branch operation can have two or more paths or sides. The suppressing can suppress data accesses associated with an untaken side. In the flow 200, a row of compute elements is enabled to perform horizontal data access suppression 216. As for the vertical column, data access suppression of horizontal data accesses can include data load accesses and data store accesses. The horizontal data access suppression can include suppressing the broadcasting of values horizontally within a row of mapped compute elements.

In the flow 200, the column of compute elements can include a vertical column of compute elements that accesses cache data 220 along a vertical axis. The access along a vertical axis can be accomplished using an interconnect, a bus, a network, and so on. The data accesses can be accomplished using one or more communication techniques. The communication techniques can include bidirectional communication techniques. In embodiments, compute elements in the vertical column of compute elements can communicate in both vertical directions. While the designation "vertical" is arbitrary, communication in both vertical directions can be understood to indicate communication up and down the column of compute elements. The communication can enable sending of control or other signals. In embodiments, the compute elements in the vertical column of compute elements can propagate an invalid indication bit up and down the column. The invalid indication bit can be used to block one or more data accesses by compute elements within the column of compute elements. Recall that in embodiments, a valid indication can accompany each data access address that emerges from the array of compute elements. A data access to an address cannot be executed if the data access address is not accompanied by a valid indication. In embodiments, the invalid indication can be designated by manipulating the valid indication. The manipulating can include changing one or more bits, inverting the valid indication, etc. In embodiments, the invalid indication can include manipulating one or more of a valid bit, a valid data tag, a valid address tag, a nonzero address, and a valid signal.

In the flow 200, the row of compute elements can include a horizontal row of compute elements that can receive state information 222 along a horizontal axis. The state can include data access valid or invalid, data ready or not ready, a priority or tag associated with data, etc. In embodiments, compute elements in the horizontal row of compute elements can communicate in both horizontal directions. As for the "vertical" designation, the "horizontal" designation is arbitrary. Here, both horizontal directions can include left and right. Communication in both horizontal directions can include broadcasting a value. The value can be associated with determining a branch decision. In embodiments, the compute elements in the horizontal row of compute elements can propagate an invalid indication across the row. The propagating an invalid indication can suppress producing data accesses. The data accesses can be associated with executing operations associated with sides of the branch operation.

The flow 200 further includes coupling a data cache 224 to the array of compute elements. The data cache can include a single level cache, a multilevel cache, and so on. The data cache can be coupled directly to the CE array directly, coupled via one or more elements, and so on. The data cache can be further coupled to one or more of access buffers, a crossbar switch, load buffers, and so on. In embodiments, the data cache can be coupled to the array of compute elements in a vertical direction. The compute elements in the vertical direction, such as compute elements within a column of compute elements, can produce data accesses such as load accesses, store accesses, etc. In embodiments, each data access address emerging from the array of compute elements can represent a potential load or store operation. Accesses to the data cache can include a memory address and a valid indication. In embodiments, a valid indication can be a prerequisite for loading and/or storing data in the data cache. If the valid indication is absent or instead indicates invalid, then a data access associated with the missing or invalid indication can be suppressed, blocked, halted, etc.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
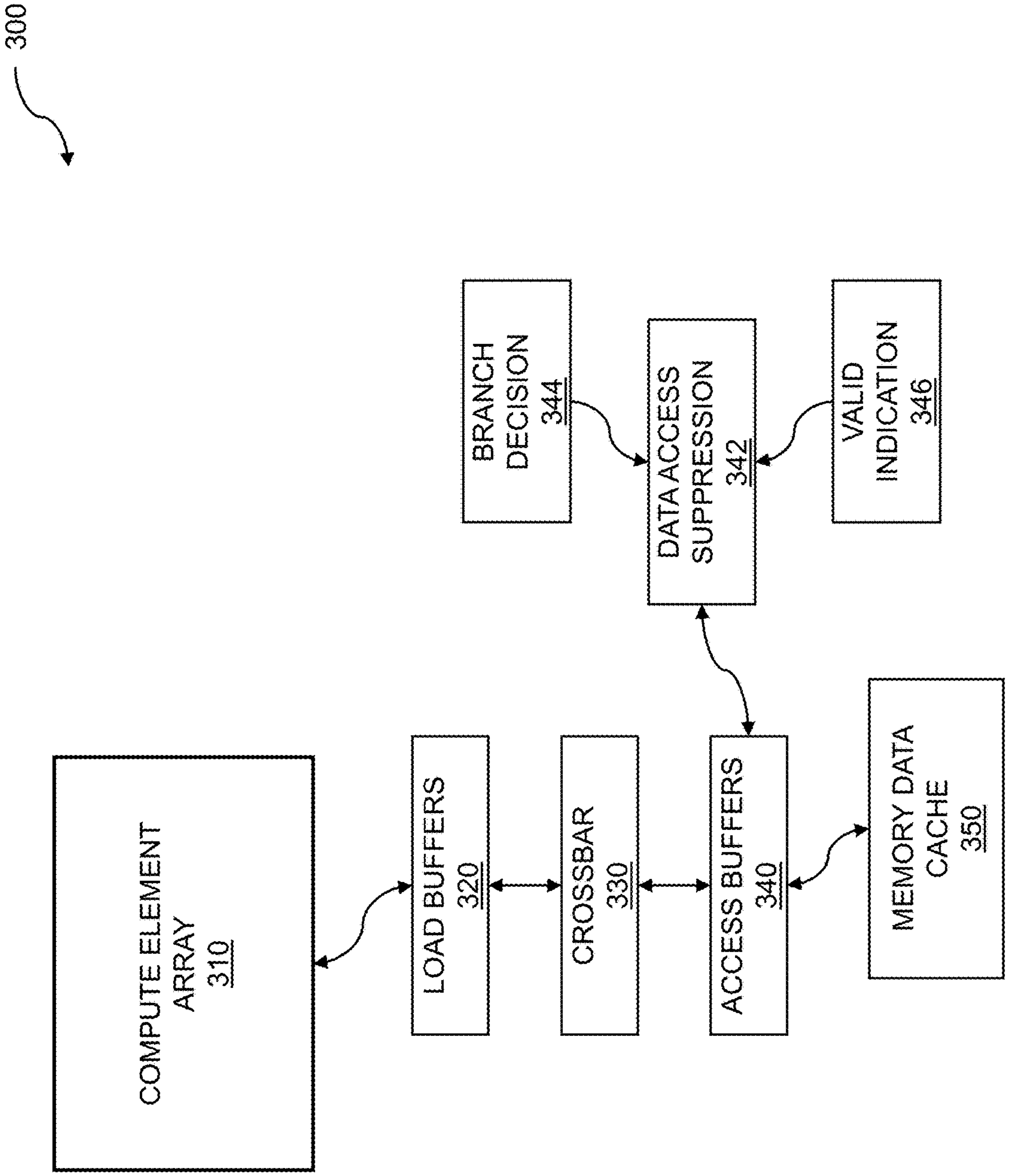
FIG. 3 is an infographic showing data access suppression.

FIG. 3 is an infographic showing data access suppression. An array of elements can be configured to process data. As discussed previously and throughout, the elements can include compute elements, processing elements, buffers, one or more levels of cache storage, system management, arithmetic logic units, multipliers, memory management units, and so on. Operations that can be performed on the compute elements can include branch operations, where a branch operation can include a branch decision and two or more branch paths. Prior to determining which branch path will be taken based on evaluating branch decision, execution of each branch path can proceed in parallel. Once the taken branch path is determined, operations such as data access operations associated with the untaken paths can be suppressed. Data access can also be suppressed based on valid data not being available when the data access operation is generated. Data access suppression can also be initiated by a compute element within a column of compute elements or by a compute element within a row of compute elements. The suppression, which can be based on an invalid indication, can prevent or suspend data access operations, thereby conserving memory bandwidth, crossbar bandwidth, and the like. The data accesses can be associated with executing operations associated with branch paths. The data access suppression is enabled by a parallel processing architecture for branch path suppression. An array of compute elements is accessed, wherein each compute element within the array of compute elements is known to a compiler and is coupled to its neighboring compute elements within the array of compute elements. Control for the array of compute elements is provided on a cycle-by-cycle basis, wherein the control is enabled by a stream of wide control words generated by the compiler, and wherein the control includes a branch. A plurality of compute elements is mapped within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression. Both sides of the branch are executed in the array of compute elements, wherein the executing includes making a branch decision. Data accesses produced by a branch operation are suppressed, based on the branch decision and an invalid indication, wherein the invalid indication is propagated among two or more of the compute elements.

Processes, tasks, subtasks, and so on can be executed on a parallel processing architecture. Some of the tasks, for example, can be executed in parallel, while others have to be properly sequenced. The sequential execution and the parallel execution of the tasks are dictated in part by the existence of or absence of data dependencies between tasks. In a usage example, a task A processes input data and produces output data that is required by task B. Thus, task A must be executed prior to executing task B. Task C, however, executes tasks that process the same input data as task A and produces output data. Thus, task C can be executed in parallel with task A. The execution of tasks can be based on memory access operations, where the memory access operations include data loads from memory, data stores to memory, and so on. If, in the example just recited, task B were to attempt to access data before task A and produced the required data, a hazard would occur. Thus, hazard detection and mitigation can be critical to successful parallel processing. In embodiments, the hazards can include write-after-read, read-after-write, and write-after-write conflicts. The hazard detection can be based on identifying memory access operations that access the same address. Precedence information associated with each memory access operation can be used to coordinate memory access operations so that valid data can be loaded, and to ensure that valid data is not corrupted by a store operation overwriting the valid data. Techniques for hazard detection and mitigation can include holding memory access data before promotion, delaying promoting data to the access buffer and/or releasing data from the access buffer, and so on.

The figure illustrates an infographic for data access suppression. Data accesses can be generated by compute elements. In the infographic 300, the compute elements can include elements within an array of compute elements 310. The subset of compute elements within the array of compute elements can be executing operations. Discussed previously, the operations can be associated with two or more sides of a branch operation. The two or more sides of the branch operation can be executed until the branch decision identifying the correct branch path to take is made. Further data access operations associated with the one or more untaken paths can be suppressed. Recall that each access to memory to load or store data can comprise an address and can be accompanied by a valid indication. The valid indication can include a signal, a flag, a bit, and so on. The valid bit associated with memory access address can indicate to “downstream” hardware (e.g., compute elements waiting for the data) that the data is valid and can be processed. An invalid indication conveys an opposite message that the data can be invalid. An invalid indication can cause one or more memory access addresses to be suppressed and not presented to memory for load or store access. The invalid indication can further correspond to reaching the end of executing a task or subtask such as a loop.

Data movement, whether loading, storing, transferring, etc., can be accomplished using a variety of techniques. In embodiments, memory access operations can be performed outside of the array of compute elements, thereby freeing the compute elements to execute tasks, subtasks, etc. Memory access operations, such as autonomous memory operations, can preload data needed by one or more compute elements. In additional embodiments, a semi-autonomous memory copy technique can be used for transferring data. The semi-autonomous memory copy can be accomplished by the array of compute elements which generates source and target addresses required for the one or more data moves. The array can further generate a data size such as 8, 16, 32, or 64-bit data sizes, and a striding value. The striding value can be used to avoid overloading a column of a storage components such as a cache memory. The source and target addresses, data size, and striding can be under direct control of a compiler.

The infographic 300 can include load buffers 320. The load buffers can include two or more buffers associated with the compute element array. The buffers can be shared by the compute elements within the array, a subset of compute elements can be assigned to each buffer, etc. The load buffers can hold data targeted to one or more compute elements within the array as the data is read from a memory such as data cache memory. The load buffers can be used to accumulate an amount of data before transferring the data to one or more compute elements, to retime (e.g., hold or delay) delivery of data loaded from storage prior to data transfer to compute elements, and the like. The infographic 300 can include a crossbar switch 330. The crossbar switch can provide selectable communication paths between buffers associated with a memory (discussed shortly below). The crossbar switch enables transit of memory access data between buffers associated with the memory and the load buffers associated with the compute elements. The crossbar switch can enable multiple data access operations within a given cycle.

The infographic 300 can include access buffers 340. Two or more access buffers can be coupled to a memory such as data cache memory (discussed below). The access buffers can hold data such as store data produced by operations associated with tasks, subtasks, etc. The operations are executed using compute elements within the array. In embodiments, the holding can be accomplished using access buffers coupled to a memory cache. The holding can be based on monitoring memory access operations that have been tagged. The tagging can be contained in the control words, and the tagging can be provided by the compiler at compile time. The load data can be held in the access buffers prior to the data transiting the crossbar switch to the load buffers or being directed to compute elements within the array. Since there is a transit latency associated with the crossbar switch, load data can transit the crossbar switch in as early a cycle as possible without triggering a hazard event.

The infographic 300 can include data access suppression 342. Data access suppression can include suppressing data accesses produced by a branch operation. The data access suppression can suppress data access loads, data access stores, and so on. The data access suppression can suppress the data access loads and stores such that the data access loads and stores do not leave the array of compute elements. Suppressing the access loads and stores in the array can prevent the accesses from being loaded into buffers such as the access buffers, from transiting the crossbar switch, and from accessing memory. The infographic 300 can include a branch decision 344. The branch decision can be a basis for the data access suppression. The branch decision can include evaluating a branch expression, where the branch expression can include a logical expression, a mathematical expression, and so on. The determining the branch decision indicates which branch path is taken and which other branch or branches are untaken. Data accesses associated with the one or more untaken branches can be suppressed because no further operations associated with the untaken branches will be executed. The infographic 300 can include a valid indication 346. The valid indication can be used to identify whether one or more data access requests are valid or invalid. The invalid indication can be shared among compute elements within a column of compute elements, a row of compute elements, etc. In embodiments, the compute elements in the horizontal row of compute elements can propagate an invalid indication across the row. Similarly, and in other embodiments, the compute elements in the vertical column of compute elements can propagate an invalid indication bit up and down the column.

The infographic 300 can include a memory data cache 350. The cache can include one or more levels of cache. In embodiments, the cache can include levels such as a level 1 (L1) cache, a level 2 (L2) cache, a level 3 (L3) cache, and so on. The L1 cache can include a small, fast memory that is accessible to the compute elements within the compute element array. The L2 cache can be larger than the L1 cache, and the L3 cache can be larger than the L2 cache and the L1 cache. When a compute element within the array initiates a load operation, the data associated with the load operation is first sought in the L1 cache, then the L2 cache if absent from the L1 cache, then the L3 cache if the load operation causes a "miss" (e.g., the requested data is not located in a cache level). The L1 cache, the L2 cache, and the L3 cache can store data, control words, compressed control words, and so on. In embodiments, the L3 cache can comprise a unified cache for data and compressed control words (CCWs).

Figure 4:
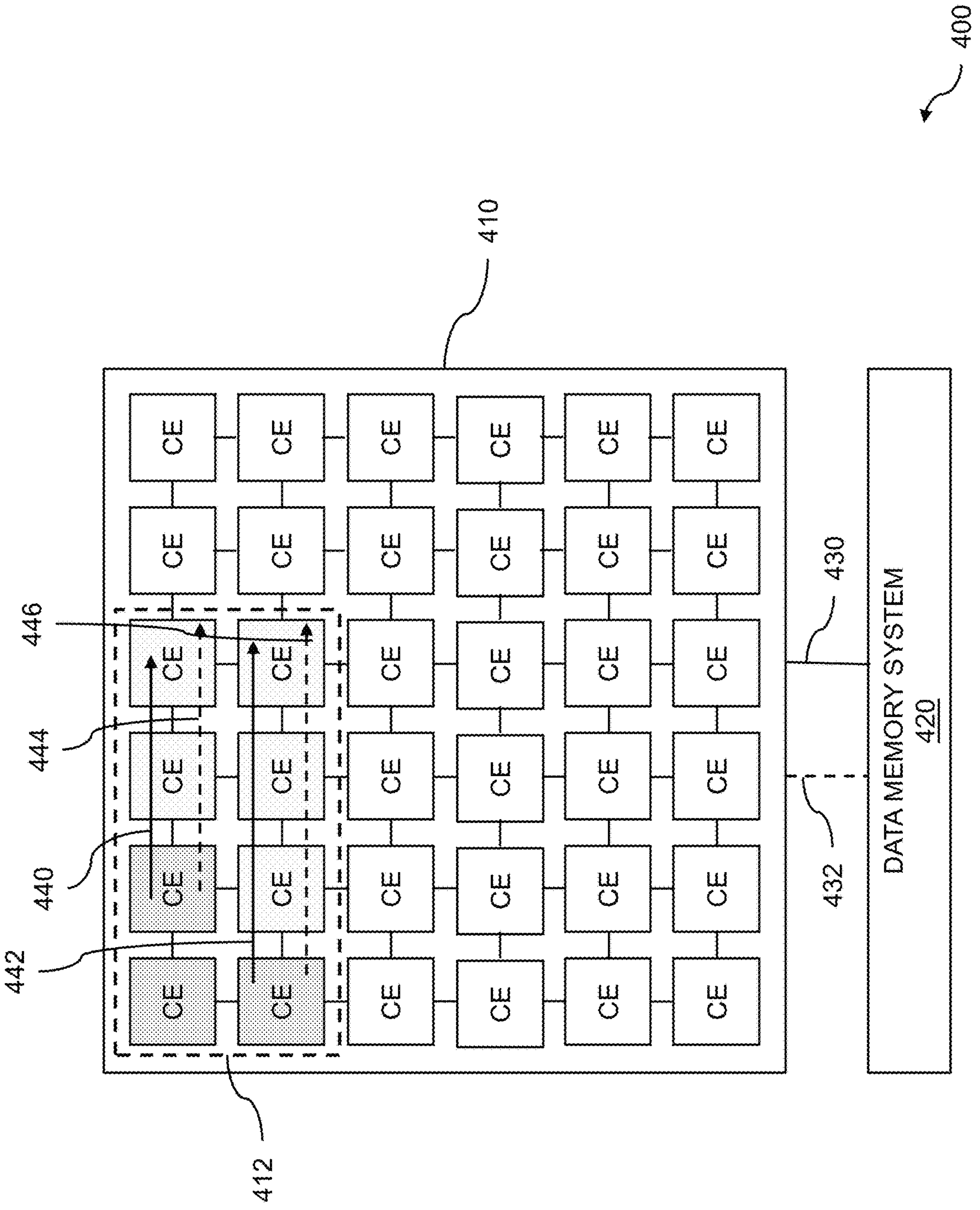
FIG. 4 is an infographic illustrating vertical and horizontal suppression.

FIG. 4 is an infographic illustrating vertical and horizontal suppression. Compute elements within an array of compute elements can be mapped with parallelized operations. The parallel operations can be associated with sides of a branch operation such as a left side and a right side. The parallelized operations associated with each of the branch sides can be executed. The executing can further determine a branch decision. The determining the branch decision can indicate which side of the branch operation will continue execution. The one or more sides of the branch operation that will not continue execution can be terminated, suspended, and so on. Further data accesses generated by operations associated with the one or more untaken sides can be suppressed. The suppression can occur vertically among compute elements, horizontally among compute elements, or both vertically and horizontally among compute elements. The suppressing is enabled by a parallel processing architecture for branch path suppression. An array of compute elements is accessed, wherein each compute element within the array of compute elements is known to a compiler and is coupled to its neighboring compute elements within the array of compute elements. Control for the array of compute elements is provided on a cycle-by-cycle basis, wherein the control is enabled by a stream of wide control words generated by the compiler, and wherein the control includes a branch. A plurality of compute elements is mapped within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression. Both sides of the branch are executed in the array of compute elements, wherein the executing includes making a branch decision. Data accesses produced by a branch operation are suppressed, based on the branch decision and an invalid indication, wherein the invalid indication is propagated among two or more of the compute elements.

The infographic 400 includes an array of compute elements (CEs) 410. The array of elements includes compute or processor elements, multiplier elements, registers, caches, buffers, controller units, decompressors, arithmetic logic units (ALUs), storage elements, memory management units (MMUs), and other components which can communicate among themselves. The infographic 400 can include a data memory system 420. The data memory system can include a cache memory, a multilevel cache memory, a shared memory, a system memory, and so on. Data accesses 430 can be generated by one or more compute elements within the array of compute elements. The data accesses can include load accesses and store accesses. The data accesses can include addresses within the data memory system. If the data accesses are valid, then data can transfer 432 from the data memory system to the compute element array (e.g., load) or from the compute elements array to the data memory system (e.g., store).

A plurality of compute elements can be mapped within the array of compute elements. The mapping can include pairs or quads of compute elements, a quadrant or region of the array of compute elements, and the like. An M×N array 412 of compute elements is shown. The array can include two rows of CEs and four columns of CEs. While a 2×4 array is shown, arrays of other sizes can also be mapped within the array of compute elements. In embodiments, the mapping can include compute elements within more than one array of compute elements. The mapping can distribute parallelized operations to the plurality of compute elements. The parallelized operations can include primitive operations. The parallelized operations can include operations associated with sides of a branch operations. The parallelized operations can be executed in parallel in the mapped CEs. In embodiments, the mapping can be determined by the compiler. The mapping can be determined by the compiler at compile time. The mapped compute elements can be configured to broadcast a value. The broadcasting can include broadcasting the value across a row of compute elements. In the figure, the broadcasting is shown by 440 in the upper row and by 442 in the lower row. In embodiments, the shared data can be processed by parallelized operations associated with sides of a branch operation.

In embodiments, a column of compute elements within the plurality of compute elements can be enabled to perform vertical data access suppression and a row of compute elements can be enabled to perform horizontal data access suppression. The suppressing can be based on a branch decision and an invalidation indication. The invalidation indication can include a bit, a flag, a signal, etc. In embodiments, the invalidation indication can comprise two bits. The suppressing can suppress data accesses produced by a branch operation. The data accesses, which can include data accesses to the data memory system, can include load accesses, store accesses, etc. In embodiments, the invalid indication can suppress loading and/or storing data in the data cache. The loading and/or storing to the data cache can include storing data in one or more buffers prior to promoting the data to the data cache or sending the data to one or more compute elements within the array. The loading and/or storing can include the data transiting a crossbar switch. In the infographic, the suppressing is shown by 444 and 446 in the upper row and the lower row, respectively. The horizontal suppression can be used to suppress broadcasting a value across a row of compute elements. The suppressing can be based on detecting or determining a value, a condition, and so on. The vertical suppression can be used to suppress data accesses associated with an untaken branch side. In embodiments, the suppressing can be disabled by resetting the invalid indication. The resetting can be accomplished by a compute element, a control element, and so on.

FIG. 5 is an infographic that illustrates spatial and temporal mapping. Discussed previously and throughout, a plurality of compute elements can be initialized by mapping the compute elements, where the mapping distributes parallelized operations to the compute elements. The initializing of the compute elements is based on a control word. The parallelized instructions are mapped into operations in each compute element. The parallelized operations can be associated with two or more paths associated with a branch operation. The parallelized operations can include primitive operations. In order to improve operational efficiency of executing the two or more branch paths, the mapping of each element of the plurality of compute elements can include a spatially adjacent mapping, where the spatially adjacent mapping can include an M×N subarray of the array of compute elements. The spatially adjacent mapping is determined by the compiler at compile time. The timing or temporal mapping of the parallelized operations further enhances execution of the branch path operations. The spatial and temporal mapping enables a parallel processing architecture with branch path suppression. An array of compute elements is accessed. Each compute element within the array of compute elements is known to a compiler and is coupled to its neighboring compute elements within the array of compute elements. Control for the compute elements is provided on a cycle-by-cycle basis. Control is enabled by a stream of wide control words generated by the compiler. The control includes a branch. A plurality of compute elements within the array of compute elements is mapped. The mapping distributes parallelized operations to the plurality of compute elements, the mapping is determined by the compiler, and a column of compute elements within the plurality of compute elements is enabled to perform vertical data access suppression and a row of compute elements is enabled to perform horizontal data access suppression. Both sides of the branch are executed in the array of compute elements. The executing includes making a branch decision. Data accesses produced by a branch operation are suppressed, based on the branch decision and an invalid indication. The invalid indication is propagated among two or more of the compute elements.

A resource utilization pipeline based on spatial and temporal mapping is shown 500. A single evaluation of a core state transition can be represented as the core state transition flows through stages of evaluation. The stages of evaluation can include: computing an address for a next symbol; fetching the next symbol; propagating the next symbol to compute elements initialized with a switch block command; evaluating cases associated with the switch block command; executing if, else if, and else evaluations; and updating a decision variable. The next symbol can include a data item, where the data item can be loaded from memory. The data item can include a value such as an integer, real, or floating-point value. The data item can be loaded or fetched from memory. The memory can include storage which is local to the compute element such as a register file, a cache memory, a system memory, and so on. The next symbol can be propagated to compute elements initialized to execute the switch block command. The propagating can be accomplished using buses accessible to the compute elements. The buses can include a bus that carries control word traffic, a bus that carries data cache traffic, and so on. The choice of bus that is used can be based on minimizing traffic on a bus. In embodiments, broadcasting along the bus that carries data cache traffic can be minimized by the compiler.

The cases can be evaluated on the compute elements, where the compute elements can execute the cases in parallel. The cases can be based on mapping the switch block command into primitive operations that can be executed in the compute elements. In embodiments, each of the primitive operations can be executed in an architectural cycle. The switch block command can include cases that are based on if, else if, and else operations. The if, else if, and else operations can be evaluated. The case result can be chosen based on a decision variable. In embodiments, a result can be indicated for the switch block command, where the returning a result is gated by the decision variable. The decision variable can be updated. In embodiments, the updating the decision variable can be based on a load into the array of compute elements from a data cache. The data cache can include a multilevel cache that can be accessible to compute elements within the array of compute elements. Various techniques can be used for the updating. In embodiments, the updating the decision variable can be accomplished by broadcasting the decision variable. The broadcasting can occur along a bus. In embodiments, the broadcasting can occur along a bus that carries control word traffic. Traffic along the control word bus can be relatively light. In embodiments, the mapping in each element of the plurality of compute elements can be performed by the compiler to minimize broadcasting along the bus that carries data cache traffic. One or more other buses can be used for the broadcasting. In embodiments, the broadcasting can occur along a bus that carries data cache traffic. The traffic along the bus that carried data cache traffic can be relatively heavy during execution of operations associated with the cases. In embodiments, the mapping in each element of the plurality of compute elements can be performed by the compiler to minimize broadcasting along the bus that carries data cache traffic.

Returning to the figure, a single evaluation of a core decision transition is shown as the transition flows through the stages of evaluation. The stages can comprise an evaluation pipeline. The pipeline can include pipelined operations such as compute next symbol address (CNSAx), fetch next symbol (FNSx), propagate next symbol to compute elements (PNSx), perform case evaluation (CEVx), perform "if", "else if", "else" evaluations (IFEx), and update the state to allow the next case evaluation (STUx). The full latency for a multiple compute element evaluation can be a number of clock cycles, shown as cycles 510, where the full latency can include a memory load of the next symbol. A cycle can include an architectural cycle. Note that since the computations can be performed on spatially adjacent and mapped compute elements, and since the primitive operations can be executed in an architectural cycle, then the evaluations can be fully pipelined. As a result, one full core decision transition evaluation can be performed every cycle when the pipeline is full.

Figure 6:
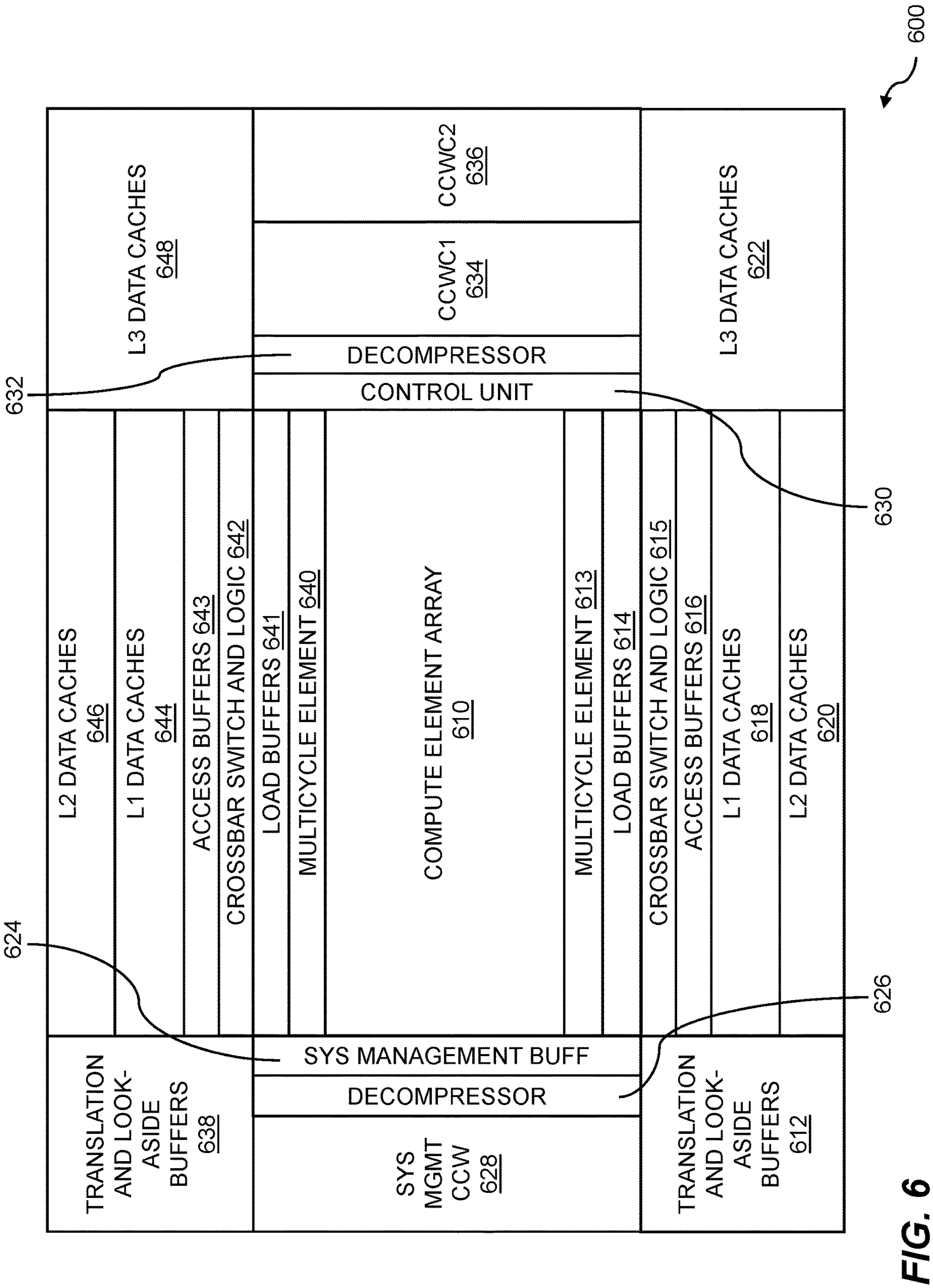
FIG. 6 is a system block diagram for a highly parallel architecture with a shallow pipeline.

FIG. 6 is a system block diagram for a highly parallel architecture with a shallow pipeline. The highly parallel architecture can comprise a variety of components such as compute elements, processing elements, buffers, one or more levels of cache storage, system management, arithmetic logic units, multipliers, memory management units, and so on. The various components can be used to accomplish parallel processing of tasks, subtasks, and the like. The parallel processing is associated with program execution, job processing, etc. The parallel processing is enabled based on a parallel processing architecture for branch path suppression. An array of compute elements is accessed, wherein each compute element within the array of compute elements is known to a compiler and is coupled to its neighboring compute elements within the array of compute elements. Control for the compute elements is provided on a cycle-by-cycle basis, wherein control is enabled by a stream of wide control words generated by the compiler. A plurality of compute elements within the array of compute elements is mapped, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression. Both sides of the branch are executed in the array of compute elements, wherein the executing includes making a branch decision. Data accesses produced by a branch operation are suppressed, based on the branch decision and an invalid indication, wherein the invalid indication is propagated among two or more of the compute elements.

A system block diagram 600 for a highly parallel architecture with a shallow pipeline is shown. The system block diagram can include a compute element array 610. The compute element array 610 can be based on compute elements, where the compute elements can include processors, central processing units (CPUs), graphics processing units (GPUs), coprocessors, and so on. The compute elements can be based on processing cores configured within chips such as application specific integrated circuits (ASICs), processing cores programmed into programmable chips such as field programmable gate arrays (FPGAs), and so on. The compute elements can comprise a homogeneous array of compute elements. The system block diagram 600 can include translation and look-aside buffers such as translation and look-aside buffers 612 and 638. The translation and look-aside buffers can comprise memory caches, where the memory caches can be used to reduce storage access times.

The system block diagram 600 can include logic for load and store access order and selection. The logic for load and store access order and selection can include crossbar switch and logic 615 along with crossbar switch and logic 642. Crossbar switch and logic 615 can accomplish load and store access order and selection for the lower data cache blocks (618 and 620), and crossbar switch and logic 642 can accomplish load and store access order and selection for the upper data cache blocks (644 and 646). Crossbar switch and logic 615 enables high-speed data communication between the lower-half compute elements of compute element array 610 and data caches 618 and 620 using access buffers 616. Crossbar switch and logic 642 enables high-speed data communication between the upper-half compute elements of compute element array 610 and data caches 644 and 646 using access buffers 643. The access buffers 616 and 643 allow logic 615 and logic 642, respectively, to hold, load, or store data until any memory hazards are resolved. In addition, splitting the data cache between physically adjacent regions of the compute element array can enable the doubling of load access bandwidth, the reducing of interconnect complexity, and so on. While loads can be split, stores can be driven to both lower data caches 618 and 620 and upper data caches 644 and 646.

The system block diagram 600 can include lower load buffers 614 and upper load buffers 641. The load buffers can provide temporary storage for memory load data so that it is ready for low latency access by the compute element array 610. The system block diagram can include dual level 1 (L1) data caches, such as L1 data caches 618 and 644. The L1 data caches can be used to hold blocks of load and/or store data, such as data to be processed together, data to be processed sequentially, and so on. The L1 cache can include a small, fast memory that is quickly accessible by the compute elements and other components. The system block diagram can include level 2 (L2) data caches. The L2 caches can include L2 caches 620 and 646. The L2 caches can include larger, slower storage in comparison to the L1 caches. The L2 caches can store "next up" data, results such as intermediate results, and so on. The L1 and L2 caches can further be coupled to level 3 (L3) caches. The L3 caches can include L3 caches 622 and 648. The L3 caches can be larger than the L2 and L1 caches and can include slower storage. Accessing data from L3 caches is still faster than accessing main storage. In embodiments, the L1, L2, and L3 caches can include 4-way set associative caches.

The system block diagram 600 can include lower multicycle element 613 and upper multicycle element 640. The multicycle elements (MEMs) can provide efficient functionality for operations, such as multiplication operations, that span multiple cycles. The MEMs can provide further functionality for operations that can be of indeterminant cycle length, such as some division operations, square root operations, and the like. The MEMs can operate on data coming out of the compute element array and/or data moving into the compute element array. Multicycle element 613 can be coupled to the compute element array 610 and load buffers 614, and multicycle element 640 can be coupled to compute element array 610 and load buffers 641.

The system block diagram 600 can include a system management buffer 624. The system management buffer can be used to store system management codes or control words that can be used to control the array 610 of compute elements. The system management buffer can be employed for holding opcodes, codes, routines, functions, etc. which can be used for exception or error handling, management of the parallel architecture for processing tasks, and so on. The system management buffer can be coupled to a decompressor 626. The decompressor can be used to decompress system management compressed control words (CCWs) from system management compressed control word buffer 628 and can store the decompressed system management control words in the system management buffer 624. The compressed system management control words can require less storage than the decompressed control words. The system management CCW component 628 can also include a spill buffer. The spill buffer can comprise a large static random-access memory (SRAM), which can be used to provide rapid support of multiple nested levels of exceptions.

The compute elements within the array of compute elements can be controlled by a control unit such as control unit 630. While the compiler, through the control word, controls the individual elements, the control unit can pause the array to ensure that new control words are not driven into the array. The control unit can receive a decompressed control word from a decompressor 632 and can drive out the decompressed control word into the appropriate compute elements of compute element array 610. The decompressor can decompress a control word (discussed below) to enable or idle rows or columns of compute elements, to enable or idle individual compute elements, to transmit control words to individual compute elements, etc. The decompressor can be coupled to a compressed control word store such as compressed control word cache 1 (CCWC1) 634. CCWC1 can include a cache such as an L1 cache that includes one or more compressed control words. CCWC1 can be coupled to a further compressed control word store such as compressed control word cache 2 (CCWC2) 636. CCWC2 can be used as an L2 cache for compressed control words. CCWC2 can be larger and slower than CCWC1. In embodiments, CCWC1 and CCWC2 can include 4-way set associativity. In embodiments, the CCWC1 cache can contain decompressed control words, in which case it could be designated as DCWC1. In that case, decompressor 632 can be coupled between CCWC1 634 (now DCWC1) and CCWC2 636.

Figure 7:
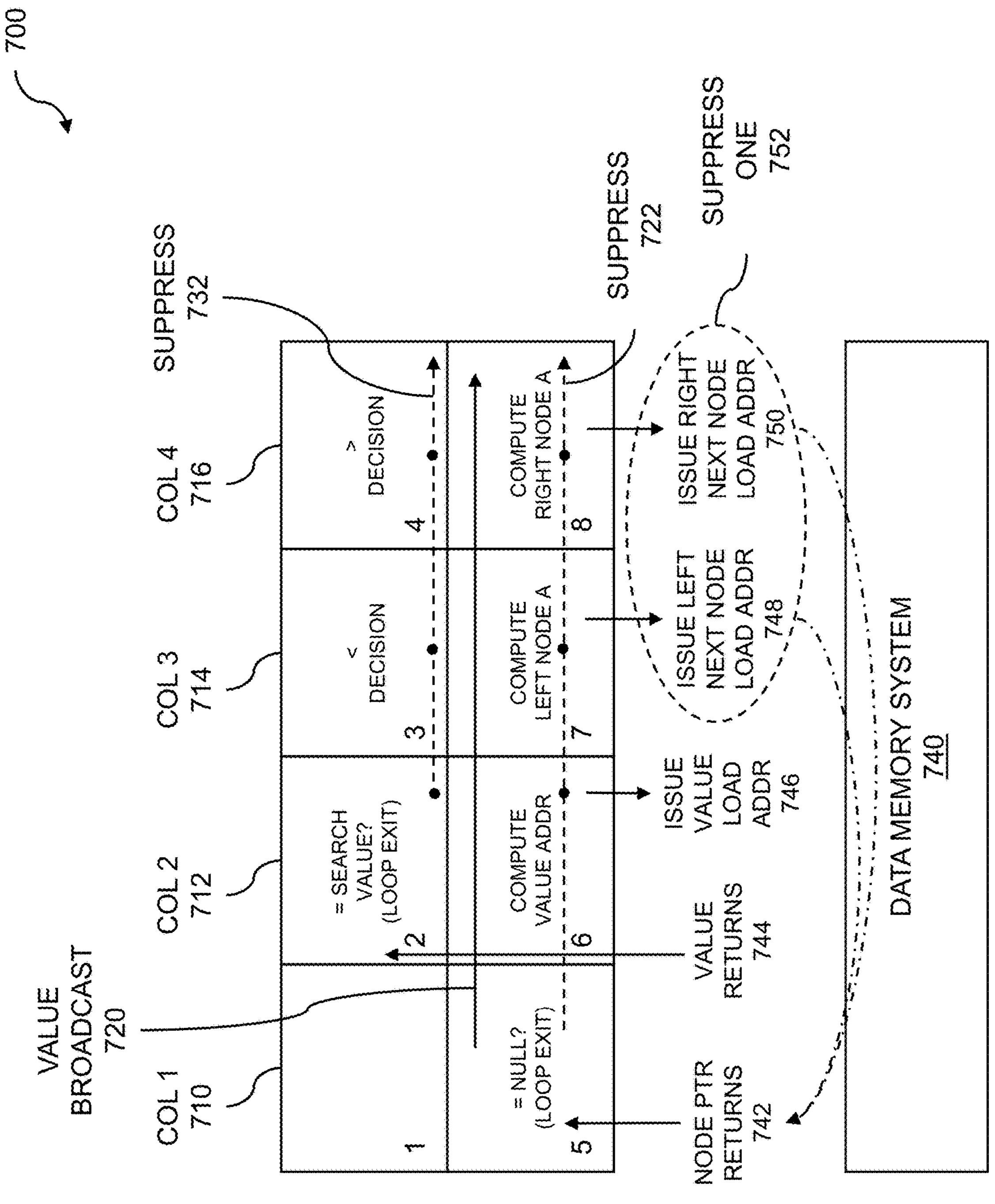
FIG. 7 shows routine spatial mapping for a pointer chasing example.

FIG. 7 shows routine spatial mapping for a pointer chasing example. Pointer chasing is a technique that can be used to determine bandwidth and latency parameters associated with a memory system. The memory system can include a shared memory, a single level or multilevel cache memory, and so on. The memory system can include a non-uniform memory access (NUMA) technique, where the NUMA technique can provide a level of cache memory such as level 3 (L3) cache memory. The memory system parameters can be measured based on one or more memory access patterns. The memory accesses can include a stride, where the stride can include a constant, variable, or random stride. The accessing the memory can include a pointer-chasing technique. The pointer chasing technique can be based on a linked list of structures, where each structure can comprise three elements. The three elements associated with each structure can include a decision value and two pointers to additional structure instances. The pointer chasing technique proceeds based on determining a decision value then selecting one of the two pointers based on the decision value. Since accessing memory to fetch an address can be completed before a reference to a next structure can be determined, then data access latency can be measured. The data access latency can include memory access latency, crossbar switch latency, bus latency, etc. Spatial mapping for pointer chasing supports a parallel processing architecture for branch path suppression.

An array of compute elements is accessed, wherein each compute element within the array of compute elements is known to a compiler and is coupled to its neighboring compute elements within the array of compute elements. Control for the array of compute elements is provided on a cycle-by-cycle basis, wherein the control is enabled by a stream of wide control words generated by the compiler, and wherein the control includes a branch. A plurality of compute elements within the array of compute elements is mapped, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression. Both sides of the branch are executed in the array of compute elements, wherein the executing includes making a branch decision. Data accesses produced by a branch operation are suppressed, based on the branch decision and an invalid indication, wherein the invalid indication is propagated among two or more of the compute elements.

Discussed previously and throughout, data accesses can be generated by compute elements as the compute elements are executing parallelized operations associated with sides of a branch operations. When a branch decision is determined, then data accesses associated with untaken sides of the branch operation can be suppressed. The example 700 shows a looping pointer chasing routine based on looping. When a loop terminates, any data access operations that are "in flight" or can be generated after termination of the loop can be suppressed. A number of cycles, such as three cycles, can be required for a determined branch decision to be in reach of a control unit (CU). The branch decision can cause a control change in the array of compute elements. The change in control can result in suppressing any potentially invalid data load accesses. Further, the suppression can originate from inside the array to meet the required data access latency constraints. In a usage example, detection of a null can indicate an end of a loop. The detection of the null can result in suppression of three data load operations that can be issued every cycle until the CU can change the flow of control (e.g., transfer control to the determined branch side).

An M×N array of compute elements numbered CE 1 through CE 8 is shown that includes two rows and four columns, such as column 1 710, column 2 712, column 3 714, and column 4 716. A plurality of the compute elements can be mapped, where the mapping distributes parallelized operations to the plurality of compute elements. In the mapping, CE 5 checks for NULL. A new pointer address value can be broadcast via a horizontal bus 720 to CEs 6, 7, and 8. In the next cycle, CEs 6, 7, and 8 can be calculating the next data access load address for their respective data while CE 5 is transmitting a determined branch decision to a control unit. Note that the data access loads issued by CEs 7 and 8 can both be designated to return to CE 5 742 at the same cycle, but that only one will actually be allowed to complete. The data access load from CE 7 can be associated with issuing a left next load address 748 and the data access load from CE 8 can be associated with issuing a right next load address 750. The "next left" and the "next right" can be associated with a left branch path and a right path respectively. One of either the left path or the right path will be suppressed 752 upon departing the array. The chosen path can return a value 744 from the data memory system. One technique that can be used to suppress the load can include a two-bit invalidation. The two-bit invalidation can be broadcast horizontally across the row in both left and/or right directions to accomplish suppression 722. The two invalidation bits can specify whether a data access load, a data access store, or both address valid bits can be suppressed for the load or store operations in that cycle (in this case load) address. The load address 746 can be vertically driven by CEs 6, 7, or 8. The load or store access is used to access a data memory system 740. The compiler can specify when a CE is receptive to the suppression signals at compile time.

The returned value 744 can be operated on by CE 2 to determine whether a search value has been found. The search value can indicate the exit of a loop. If the exit of the loop is indicated, then data access operations associated with CE 5 and CE 6 can be suppressed 732. The returned value can be propagated to CE 5 and CE 6 so that a determination can be made about the returned value. CE 5 can determine an inequality (less than) between a search value and a value pointed to by a pointer. If the inequality (less than) is true, then a left path can be chosen. CE 6 can determine a second inequality (greater than) between the search value and the value pointed to by the pointer. If the inequality (greater than) is true, then a right path can be chosen.

Two forms of memory access suppression are illustrated in the example 700. Memory access (in this case a load) suppression via address invalidation in a single column (in this case for a single cycle of load address issuance) and direct load suppression by address invalidation for multiple columns are broadcast horizontally across those columns for multiple cycles (e.g., a loop exit type of case). These two techniques can support many forms of aggressive parallel mapping of looping structures in the array while suppressing potentially invalid memory accesses during branch shadow periods.

Figure 8:
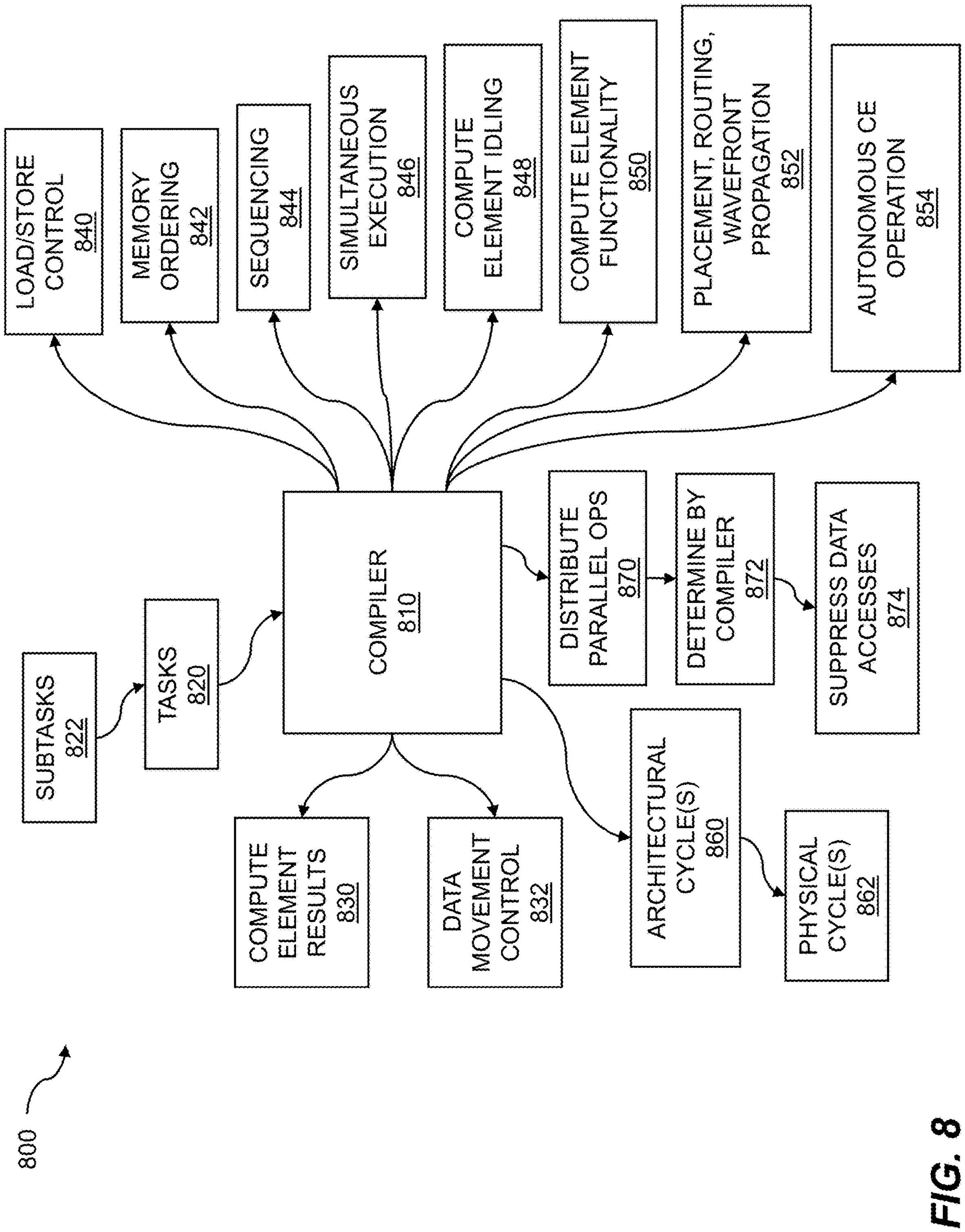
FIG. 8 is a system block diagram for compiler interactions.

FIG. 8 is a system block diagram for compiler interactions. Discussed throughout, compute elements within an array are known to a compiler which can compile processes, tasks, subtasks, and so on for execution on the array. The compiled tasks, subtasks, etc. comprise operations which can be executed on one or more compute elements within the array. The compiled tasks and subtasks are executed to accomplish task processing. The task processing can be accomplished based on parallel processing of the tasks and subtasks. Processing the tasks and subtasks includes accessing memory such a data memory, a cache, a scratchpad memory, etc. The memory accesses can cause memory access hazards if the memory accesses are not carefully orchestrated. A variety of interactions, such as placement of tasks, routing of data, and so on, can be associated with or generated by the compiler. The compiler interactions enable a parallel processing architecture for branch path suppression. An array of compute elements is accessed, wherein each compute element within the array of compute elements is known to a compiler and is coupled to its neighboring compute elements within the array of compute elements. Control for the compute elements is provided on a cycle-by-cycle basis, wherein control is enabled by a stream of wide control words generated by the compiler. A plurality of compute elements is mapped within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression. Both sides of the branch are executed in the array of compute elements, wherein the executing includes making a branch decision. Data accesses produced by a branch operation are suppressed, based on the branch decision and an invalid indication, wherein the invalid indication is propagated among two or more of the compute elements.

The system block diagram 800 includes a compiler 810. The compiler can include a high-level compiler such as a C, C++, Python, or similar compiler. The compiler can include a compiler implemented for a hardware description language such as a VHDL™ or Verilog™ compiler. The compiler can include a compiler for a portable, language-independent, intermediate representation such as a low-level virtual machine (LLVM) intermediate representation (IR). The compiler can generate a set of directions that can be provided to the compute elements and other elements within the array. The compiler can be used to compile tasks 820. The tasks can include a plurality of tasks associated with a processing task. The tasks can further include a plurality of subtasks 822. The tasks can be based on an application such as a video processing or audio processing application. In embodiments, the tasks can be associated with machine learning functionality. The compiler can generate directions for handling compute element results 830. The compute element results can include results derived from arithmetic, vector, array, and matrix operations; Boolean operations; and so on. In embodiments, the compute element results are generated in parallel in the array of compute elements. Parallel results can be generated by compute elements, where the compute elements can share input data, use independent data, and the like. The compiler can generate a set of directions that controls data movement 832 for the array of compute elements. The control of data movement can include movement of data to, from, and among compute elements within the array of compute elements. The control of data movement can include loading and storing data, such as temporary data storage, during data movement. In other embodiments, the data movement can include intra-array data movement.

As with a general-purpose compiler used for generating tasks and subtasks for execution on one or more processors, the compiler 810 can provide directions for task and subtask handling, input data handling, intermediate and resultant data handling, and so on. The directions can include one or more operations, where the one or more operations can be executed by one or more compute elements within the array of compute elements. The compiler can further generate directions for configuring the compute elements, storage elements, control units, ALUs, and so on, associated with the array. As previously discussed, the compiler generates directions for data handling to support the task handling. The directions can further enable spatially adjacent mapping of compute elements to support switch block execution. In embodiments, spatially adjacent mapping can be determined at compile time by the compiler. In the system block diagram, the data movement can include loads and stores 840 within a memory array. The loads and stores can include handling various data types such as integer, real or float, double-precision, character, and other data types. The loads and stores can load and store data into local storage such as registers, register files, caches, and the like. The caches can include one or more levels of cache such as a level 1 (L1) cache, a level 2 (L2) cache, a level 3 (L3) cache, and so on. The loads and stores can also be associated with storage such as shared memory, distributed memory, etc. In addition to the loads and stores, the compiler can handle other memory and storage management operations including memory precedence. In the system block diagram, the memory access precedence can enable ordering of memory data 842. Memory data can be ordered based on task data requirements, subtask data requirements, and so on. The memory data ordering can enable parallel execution of tasks and subtasks.

In the system block diagram 800, the ordering of memory data can enable compute element result sequencing 844. In order for task processing to be accomplished successfully, tasks and subtasks must be executed in an order that can accommodate task priority, task precedence, a schedule of operations, and so on. The memory data can be ordered such that the data required by the tasks and subtasks can be available for processing when the tasks and subtasks are scheduled to be executed. The results of the processing of the data by the tasks and subtasks can therefore be ordered to optimize task execution, to reduce or eliminate memory contention conflicts, etc. The system block diagram includes enabling simultaneous execution 846 of two or more potential compiled task outcomes based on the set of directions. The code that is compiled by the compiler can include branch points, where the branch points can include computations or flow control. Flow control transfers program execution to a different sequence of control words. Since the result of a branch decision, for example, is not known a priori, the initial operations associated with both paths are encoded in the currently executing control word stream. When the correct result of the branch is determined, then the sequence of control words associated with the correct branch result continues execution, while the operations for the branch path not taken are halted and side effects may be flushed. In embodiments, the two or more potential branch paths can be executed on spatially separate compute elements within the array of compute elements.

The system block diagram includes compute element idling 848. In embodiments, the set of directions from the compiler can idle an unneeded compute element within a row of compute elements located in the array of compute elements. Not all of the compute elements may be needed for processing, depending on the tasks, subtasks, and so on that are being processed. The compute elements may not be needed simply because there are fewer tasks to execute than there are compute elements available within the array. In embodiments, the idling can be controlled by a single bit in the control word generated by the compiler. In the system block diagram, compute elements within the array can be configured for various compute element functionalities 850. The compute element functionality can enable various types of compute architectures, processing configurations, and the like. In embodiments, the set of directions can enable machine learning functionality. The machine learning functionality can be trained to process various types of data such as image data, audio data, medical data, etc. In embodiments, the machine learning functionality can include neural network implementation. The neural network can include a convolutional neural network, a recurrent neural network, a deep learning network, and the like. The system block diagram can include compute element placement, results routing, and computation wave-front propagation 852 within the array of compute elements. The compiler can generate directions that can place tasks and subtasks on compute elements within the array. The placement can include placing tasks and subtasks based on data dependencies between or among the tasks or subtasks, placing tasks that avoid memory conflicts or communications conflicts, etc. The directions can also enable computation wave-front propagation. Computation wave-front propagation can implement and control how execution of tasks and subtasks proceeds through the array of compute elements. The system block diagram 800 can include autonomous compute element (CE) operation 854. As described throughout, autonomous CE operation enables one or more operations to occur outside of direct control word management.

In the system block diagram, the compiler can control architectural cycles 860. An architectural cycle can include an abstract cycle that is associated with the elements within the array of elements. The elements of the array can include compute elements, storage elements, control elements, ALUs, and so on. An architectural cycle can include an "abstract" cycle, where an abstract cycle can refer to a variety of architecture level operations such as a load cycle, an execute cycle, a write cycle, and so on. The architectural cycles can refer to macro-operations of the architecture rather than to low level operations. One or more architectural cycles are controlled by the compiler. Execution of an architectural cycle can be dependent on two or more conditions. In embodiments, an architectural cycle can occur when a control word is available to be pipelined into the array of compute elements and when all data dependencies are met. That is, the array of compute elements does not have to wait for either dependent data to load or for a full memory buffer to clear. In the system block diagram, the architectural cycle can include one or more physical cycles 862. A physical cycle can refer to one or more cycles at the element level required to implement a load, an execute, a write, and so on. In embodiments, the set of directions can control the array of compute elements on a physical cycle-by-cycle basis. The physical cycles can be based on a clock such as a local, module, or system clock, or some other timing or synchronizing technique. In embodiments, the physical cycle-by-cycle basis can include an architectural cycle. The physical cycles can be based on an enable signal for each element of the array of elements, while the architectural cycle can be based on a global, architectural signal. In embodiments, the compiler can provide, via the control word, valid bits for each column of the array of compute elements, on the cycle-by-cycle basis. A valid bit can indicate that data is valid and ready for processing, that an address such as a jump address is valid, and the like. In embodiments, the valid bits can indicate that a valid memory load access is emerging from the array. The valid memory load access from the array can be used to access data within a memory or storage element. In other embodiments, the compiler can provide, via the control word, operand size information for each column of the array of compute elements. Various operand sizes can be used. In embodiments, the operand size can include bytes, half-words, words, and doublewords.

The system block diagram 800 includes distributing parallelized operations 870 to the plurality of compute elements. The distributing the parallelized operations is associated with mapping a plurality of compute elements. The parallelized operations can be associated with one or more processes, where the one or more processes can comprise tasks, subtasks, and so on. The parallelized operations can include one or more of memory access operations, logical operations, arithmetic operations, and so on. The operations can further include matrix operations, tensor operations, etc. The parallelized operations can be distributed to the compute elements via an interconnect, a bus, one or more communications channels, and the like. The parallelized operations can include substantially similar operations distributed to a plurality of compute elements. The substantially similar operations can process portions of data such as a dataset, different datasets, etc. In other embodiments, the parallelized operations can include substantially different operations. The substantially different operations may have no data dependencies, interoperation communications, etc., enabling the substantially different operations to be executed in parallel.

In the system block diagram 800 the compiler is used to determine the mapping 872 of the plurality of parallelized operations. The mapping can include a topology, where the topology can include a pointer chasing topology. A pointer chasing topology can be used to gauge one or more processor characteristics, such as processing rate, to measure memory access bandwidth and latencies, and the like. The mapping that can be determined by the compiler can include a column, row, grouping, region, quadrant, etc. of compute elements within the array of compute elements. Discussed previously, the compiler can include a high-level compiler such as a C, C++, Python, or similar compiler; a compiler implemented for a hardware description language such as a VHDL™ or Verilog™ compiler; a compiler for a portable, language-independent, intermediate representation such as a low-level virtual machine (LLVM) intermediate representation (IR), etc. The compiler can determine the mapping of the compute elements based on tasks, subtasks, and the like, to be executed. The mapping can be determined by the compiler while memory access latency remains unknown to the compiler at compile time. The memory access latency is unknown at compile time because the memory access latency is dependent on which operations are executing on one or more compute elements when a memory access operation is executed. Further, memory access latency can be dependent on bus latency, crossbar switch transit latency, etc.

The system block diagram 800 includes data access suppression 874. The data access suppression can include suppression of operations such as memory access operations associated with one or more untaken branch paths. The memory access operations can include access to cache memory, local memory, shared memory, etc. In embodiments, the invalid indication can suppress loading and/or storing data in the data cache. Recall that prior to a branch decision being determined, operations associated with each branch path can be executed in parallel. When the branch decision is determined, then operations associated with the one or more untaken paths can be suppressed. In embodiments, a column of compute elements within the plurality of compute elements is enabled to perform vertical data access suppression and a row of compute elements is enabled to perform horizontal data access suppression. In addition to the branch decision, the suppressing can further be based on a flag, a signal, and so on, which can be generated by a control element. In embodiments, the data accesses produced by a branch operation are suppressed, based on the branch decision and an invalid indication. The invalid indication can be associated with an untaken branch path, a data-not-ready state, and the like. The invalid indication can be shared among compute elements within a column, a row, and the like. In embodiments, the invalid indication can be propagated among two or more of the compute elements. The two or more compute elements can be contained within a row, a column, etc. The suppressing loading and/or storing of data can be disabled when one or more conditions that occurred to cause the suppression have ended, been corrected, etc. In embodiments, the suppressing can be disabled by resetting the invalid indication.

Figure 9:
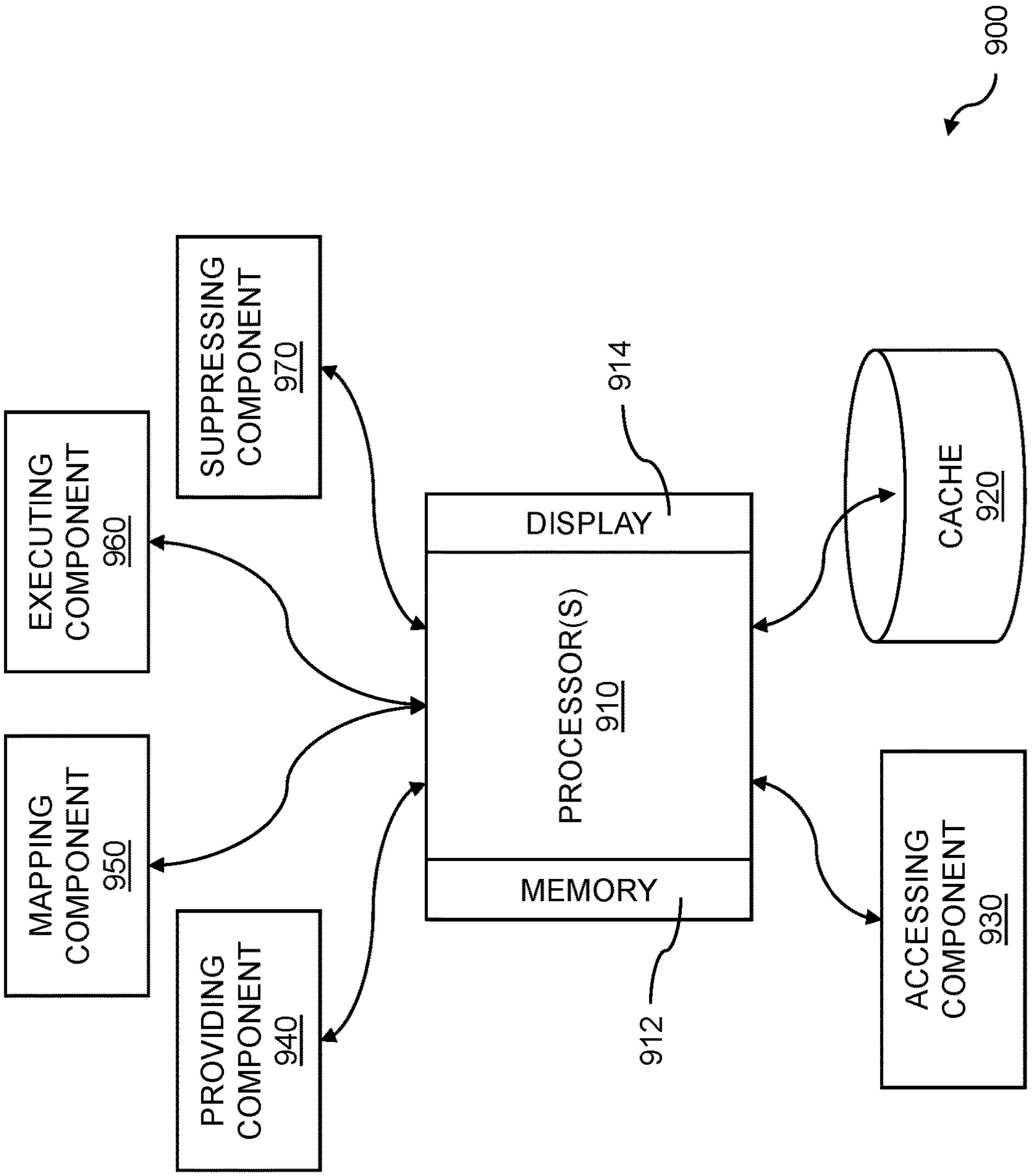
FIG. 9 is a system diagram for a parallel processing architecture for branch path suppression.

FIG. 9 is a system diagram for parallel processing. The parallel processing is accomplished by a parallel processing architecture for branch path suppression. The system 900 can include one or more processors 910, which are coupled to a memory 912 which stores instructions. The system 900 can further include a display 914 coupled to the one or more processors 910 for displaying data such as compute element maps; indications such as valid indications; address tags; intermediate steps; directions; compressed control words; fixed-length control words; control words implementing Very Long Instruction Word (VLIW) functionality; topologies including systolic, vector, cyclic, spatial, streaming, or VLIW topologies; and so on. In embodiments, one or more processors 910 are coupled to the memory 912, wherein the one or more processors, when executing the instructions which are stored, are configured to: access an array of compute elements, wherein each compute element within the array of compute elements is known to a compiler and is coupled to its neighboring compute elements within the array of compute elements; provide control for the array of compute elements on a cycle-by-cycle basis, wherein the control is enabled by a stream of wide control words generated by the compiler, and wherein the control includes a branch; map a plurality of compute elements within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression; execute both sides of the branch in the array of compute elements, wherein the executing includes making a branch decision; and suppress data accesses produced by a branch operation, based on the branch decision and an invalid indication, wherein the invalid indication is propagated among two or more of the compute elements. The stream of wide control words can include a plurality of compressed control words. The plurality of compressed control words is decompressed by hardware associated with the array of compute elements and is driven into the array. The plurality of compressed control words is decompressed into fixed-length control words that comprise one or more compute element operations. The compute element operations are executed within the array of compute elements. The compute elements can include compute elements within one or more integrated circuits or chips; compute elements or cores configured within one or more programmable chips such as application specific integrated circuits (ASICs); field programmable gate arrays (FPGAs); heterogeneous processors configured as a mesh; standalone processors; etc.

The system 900 can include a cache 920. The cache 920 can be used to store data such as operations associated with two or more sides associated with a branch operation. In embodiments, the data can include a mapping of a plurality of compute elements. The mapping can distribute parallelized operations to the plurality of compute elements. The cache can further be used to store precedence information; directions to compute elements; decompressed, fixed-length control words; compute element operations associated with decompressed control words; intermediate results; microcode; branch decisions; and so on. The cache can comprise a small, local, easily accessible memory available to one or more compute elements. The data that is stored within the cache can include the precedence information which enables hardware ordering of memory access loads to the array of compute elements and memory access stores from the array of compute elements. The precedence information can provide semantically correct operation ordering. The data that is stored within the cache can further include linking information; compressed control words; decompressed, fixed-length control words; etc. Embodiments include storing relevant portions of a control word within the cache associated with the array of compute elements. The cache can be accessible to one or more compute elements. The cache can be coupled to operate in cooperation with, etc. scratchpad storage. The scratchpad storage can include a small, fast, local memory element coupled to one or more compute elements. In embodiments, the scratchpad storage can act as a "level zero" or L0 cache within a multi-level cache storage hardware configuration.

The system 900 can include an accessing component 930. The accessing component 930 can include control logic and functions for accessing an array of compute elements. Each compute element within the array of compute elements is known to a compiler and is coupled to its neighboring compute elements within the array of compute elements. A compute element can include one or more processors, processor cores, processor macros, and so on. Each compute element can include an amount of local storage such as local cache, shared cache, etc. The local storage may be accessible to one or more compute elements. Each compute element can communicate with neighbors, where the neighbors can include nearest neighbors or more remote "neighbors". Communication between and among compute elements can be accomplished using a bus such as an industry standard bus, a ring bus, a network such as a wired or wireless computer network, etc. In embodiments, the ring bus is implemented as a distributed multiplexor (MUX).

The system 900 can include a providing component 940. The providing component 940 can include control and functions for providing control for the compute elements on a cycle-by-cycle basis, wherein control is enabled by a stream of wide control words generated by the compiler, and wherein the control includes a branch. The plurality of control words enables compute element configuration and operation execution, compute element memory access, inter-compute element communication, etc., on a cycle-by-cycle basis. The control words can further include variable bit-length control words, compressed control words, and so on. The control words can be based on low-level control words such as assembly language words, microcode words, firmware words, and so on. In embodiments, the stream of wide, variable length control words generated by the compiler provides direct fine-grained control of the 2D array of compute elements. The compute operations can include a read-modify-write operation. The compute operations can enable audio or video processing, artificial intelligence processing, machine learning, deep learning, and the like. The providing control can be based on microcode control words, where the microcode control words can include opcode fields, data fields, compute array configuration fields, etc. The compiler that generates the control can include a general-purpose compiler, a parallelizing compiler, a compiler optimized for the array of compute elements, a compiler specialized to perform one or more processing tasks, and so on. The providing control can implement one or more topologies such as processing topologies within the array of compute elements. In embodiments, the topologies implemented within the array of compute elements can include a systolic, a vector, a cyclic, a spatial, a streaming, or a Very Long Instruction Word (VLIW) topology. Other topologies can include a neural network topology. The control can enable machine learning functionality for the neural network topology. The branch can include a branch decision, where the branch decision can be determined based on a logical function, an arithmetic computation, and the like.

The control of the array of compute elements on a cycle-by-cycle basis can include configuring the array to perform various compute operations. In embodiments, the stream of wide control words generated by the compiler provides direct fine-grained control of the 2D array of compute elements. The fine-grained control can include individually controlling each compute element, irrespective of type of compute element. A compute element type can include an integer, floating-point, address generation, write buffer, or read buffer element, etc. The compute operations can include a read-modify-write operation. The compute operations can enable audio or video processing, artificial intelligence processing, machine learning, deep learning, and the like. The providing control can be based on microcode control words, where the microcode control words can include opcode fields, data fields, compute array configuration fields, etc. The compiler that generates the control can include a general-purpose compiler, a parallelizing compiler, a compiler optimized for the array of compute elements, a compiler specialized to perform one or more processing tasks, and so on. The providing control can implement one or more topologies, such as processing topologies within the array of compute elements. In embodiments, the topologies implemented within the array of compute elements can include a systolic, a vector, a cyclic, a spatial, a streaming, or a Very Long Instruction Word (VLIW) topology. Other topologies can include a network topology such as a neural network topology, a Petri Net topology, etc. A control can enable machine learning functionality for the neural network topology.

In embodiments, the control word from the stream of wide control words can include a source address, a target address, a block size, and a stride. The target address can include an absolute address, a relative address, an indirect address, and so on. The block size can be based on a logical block size, a physical memory block size, and the like. In embodiments, the memory block transfer control logic can compute memory addresses. The memory addresses can be associated with memory coupled to the 2D array of compute elements, shared memory, a memory system, etc. Further embodiments can include using memory block transfer control logic. The memory block transfer control logic can include one or more dedicated logic blocks, configurable logic, etc. In embodiments, the memory block transfer control logic can be implemented outside of the 2D array of compute elements. The transfer control logic can include a logic element coupled to the 2D array. In other embodiments, the memory block transfer control logic can operate autonomously from the 2D array of compute elements. In a usage example, a control word that includes a memory block transfer request can be provided to the memory block transfer control logic. The logic can execute the memory block transfer while the 2D array of compute elements is processing control words, executing compute element operations, and the like. In other embodiments, the memory block transfer control logic can be augmented by configuring one or more compute elements from the 2D array of compute elements. The compute elements from the 2D array can provide interfacing operations between compute elements within the 2D array and the memory block transfer control logic. In other embodiments, the configuring can initialize compute element operation buffers within the one or more compute elements. The compute element operation buffers can be used to buffer control words, decompressed control words, portions of control words, etc. In further embodiments, the operation buffers can include bunch buffers. Control words are based on bits. Sets of control word bits, called bunches, can be loaded into buffers, called bunch buffers. The bunch buffers are coupled to compute elements and can control the compute elements. The control word bunches are used to configure the 2D array of compute elements, and to control the flow or transfer of data within and the processing of the tasks and subtasks on the compute elements within the array.

The control words that are generated by the compiler can further include a conditionality such as a branch. In embodiments, the control words can include branch operations. The branch can include a conditional branch, an unconditional branch, etc. The control words can be decompressed by a decompressor logic block that decompresses words from a compressed control word cache on their way to the array. In embodiments, the set of directions can include a spatial allocation of subtasks on one or more compute elements within the array of compute elements. In other embodiments, the set of directions can enable multiple, simultaneous programming loop instances circulating within the array of compute elements. The multiple programming loop instances can include multiple instances of the same programming loop, multiple programming loops, etc.

The system block diagram 900 can include a mapping component 950. The mapping component 950 can include control and functions for mapping a plurality of compute elements within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression. The mapping the compute elements can include mapping parallelized operations to compute elements, configuring or scheduling the compute elements, and so on. The parallelized operations can include one or more primitive operations in each element of the plurality of compute elements. A primitive operation can include an arithmetic operation such as addition and subtraction; a logical operation such as AND, OR, NAND, NOR, NOT, XOR, and XNOR; data operations such as load and store operations; etc. The initializing is based on a control word from the stream of control words. The initializing can be accomplished using one or more control words from the stream of wide control words provided on a cycle-by-cycle basis. The control words are generated by the compiler. In embodiments, the mapping in each element of the plurality of compute elements comprises a spatially adjacent mapping. The spatially adjacent mapping can include pairs or quads of compute elements, regions within the array, array quadrants, and the like. In embodiments, the spatially adjacent mapping can include an M×N subarray of the array of compute elements. The M×N array can be configured in various orientations such as vertical (M>N), horizontal (M<N), square (M+N), etc. In embodiments, the M×N subarray includes non-primitive mapped compute elements.

In embodiments, the mapping includes at least one column of compute elements and one row of compute elements for each simultaneous data access, based on the compiler. While the designation of a "column" of compute elements and the designation of a "row" of compute elements can be arbitrary, for this discussion, a column can include a vertical subset of compute elements, and a row can include a horizontal subset of compute elements. In embodiments, the row of compute elements can include a horizontal row of compute elements that receives state information along a horizontal axis. The row of compute elements can have a "height" of one or more compute elements. The state information can include load or store state, register state, compute element state such as active or idle, and so on. The state information can be shared along the horizontal row of compute elements. In embodiments, compute elements in the horizontal row of compute elements can communicate in both horizontal directions. The communication can occur both left and right along the row of compute elements. A variety of data, signals, flags, indications, and so on can be communicated. In embodiments, the compute elements in the horizontal row of compute elements can propagate an invalid indication across the row. The invalid indication can halt or suspend operations being processed by one or more compute elements. Communications can be accomplished vertically within the array of compute elements. In embodiments, the column of compute elements can include a vertical column of compute elements that accesses cache data along a vertical axis. The vertical column of compute elements can have a "width" of one or more compute elements. In embodiments, compute elements in the vertical column of compute elements can communicate in both vertical directions. The communication can include communication up and down the column of compute elements. The communication can comprise communication with nearest, neighboring compute elements within the column, "remote" neighbors, and so on. In embodiments, the compute elements in the vertical column of compute elements can propagate an invalid indication bit up and down the column. The propagation can be accomplished using interconnect, a bus such as a ring bus, and the like.

The system 900 can include an executing component 960. The executing component 960 can include control and functions for executing both sides of the branch in the array of compute elements, wherein the executing includes making a branch decision. If the branch comprises more than two sides, then additional sides of the branch can also be executed in the array of compute elements. The executing side of the branch can be accomplished in one or more architectural cycles. Discussed previously and throughout, the branch can be based on a branch decision. The branch decision can include evaluating an expression, where the expression can be based on a logical expression, an arithmetic expression, and so on. The logical expression can include logic operations such as AND, OR, NAND, NOR, XOR, XNOR, and so on. The arithmetic expression can include arithmetic operations such as multiplication, division, addition, subtraction, equality, inequality, etc. Note that the executing sides of a branch can occur prior to the branch decision being made. The executing all sides of the branch can occur in parallel and can be performed prior to the making the branch decision. The executing component can evaluate or "make" the branch decision, where the branch decision can determine with branch path will be taken based on the branch decision evaluation. When the branch decision is made, execution of the taken path can continue while execution of other paths can be halted, terminated, suspended, and the like.

The operations associated with the sides of the branch can generate memory access operations. Memory access operations associated with the branch side or path operations can be monitored and controlled by a control unit. The control unit can further be used to control the array of compute elements on a cycle-by-cycle basis. The controlling can be enabled by the stream of wide control words generated by the compiler. The control words can be based on low-level control words such as assembly language words, microcode words, firmware words, and so on. The control words can be of variable length, such that a different number of operations for a differing plurality of compute elements can be conveyed in each control word. The control of the array of compute elements on a cycle-by-cycle basis can include configuring the array to perform various compute operations. In embodiments, the stream of wide control words comprises variable length control words generated by the compiler. In embodiments, the stream of wide, variable length control words generated by the compiler provides direct fine-grained control of the 2D array of compute elements. The compute operations can include a read-modify-write operation. The compute operations can enable audio or video processing, artificial intelligence processing, machine learning, deep learning, and the like. The providing control can be based on microcode control words, where the microcode control words can include opcode fields, data fields, compute array configuration fields, etc. The compiler that generates the control can include a general-purpose compiler, a parallelizing compiler, a compiler optimized for the array of compute elements, a compiler specialized to perform one or more processing tasks, and so on. The providing control can implement one or more topologies, such as processing topologies, within the array of compute elements. In embodiments, the topologies implemented within the array of compute elements can include a systolic, a vector, a cyclic, a spatial, a streaming, or a Very Long Instruction Word (VLIW) topology. Other topologies can include a neural network topology. A control word can enable machine learning functionality for the neural network topology.

The branch decision can be based on a decision variable. The decision variable can be used to determine which side or path associated with the branch is the true or taken side. The branch decision can be based on a value such as an integer, real, or floating-point value. In embodiments, the decision can be provided by one of the plurality of compute elements. The compute element can provide the decision based on evaluation of an expression associated with the branch. Further embodiments include updating the decision variable. The decision variable can be updated based on evaluation of an operation such as an arithmetic or logical operation. The evaluation can be based on the primitive operation associated with a branch path indicated by the decision variable. In embodiments, the outcome of one of the operations can include a variable compare operation. The variable compare operation can compare a variable to a constant, to another variable, and so on. The variable compare operation can include an equality or an inequality such as A=B, A<B, A>B, etc. In embodiments, the updating the decision variable can be accomplished by broadcasting the decision variable. The decision variable can be broadcast to compute elements within the array of compute elements. The broadcasting can occur along a bus, such as a bus that carries control word traffic, a bus that carries data cache traffic, and so on.

The system 900 can include a suppressing component 970. The suppressing component 970 can include control and functions for suppressing data accesses produced by a branch operation, based on the branch decision and an invalid indication, wherein the invalid indication is propagated among two or more of the compute elements. Recall that the various branch paths can be executed in parallel prior to obtaining a branch decision. The branch paths can include operations such as memory access operations which can be executed prior to a branch decision being made. When the branch decision is made, then memory access operations associated with untaken paths can be suppressed. Further, the data that can be required in order to execute operations associated with the taken branch path can be dependent on other executed operations. The other executed operations can be required to execute prior to obtaining data for a given, subsequent operation. In embodiments, the invalid indication can suppress loading and/or storing data in the data cache. The suppressed loading can include suppressed memory access load operations generated by one or more compute elements. The suppressed storing can include suppressed memory access store operations for data generated by one or more compute elements. In embodiments, a valid indication can be a prerequisite for loading and/or storing data in the data cache. Without a valid indication or with an invalid indication, the loading and storing can be suppressed. In other embodiments, the suppressing can be disabled by resetting the invalid indication. Resetting the invalid indication can re-enable loading and/or storing data in the data cache.

Recall that control words generated by the compiler are provided to control the compute elements on a cycle-by-cycle basis. The control words can include uncompressed control words, compressed control words, and so on. Further embodiments include decompressing a plurality of compressed control words. The decompressing the compressed control words can include enabling or disabling individual compute elements, rows or columns of compute elements, regions of compute elements, and so on. The decompressed control words can include one or more compute element operations. Further embodiments include executing operations within the array of compute elements using the plurality of compressed control words that were decompressed. The order in which the operations are executed is critical to successful processing such as parallel processing. In embodiments, the decompressor can operate on compressed control words that were ordered before they are presented to the array of compute elements. The operations that can be performed can include arithmetic operations, Boolean operations, matrix operations, neural network operations, and the like. The operations can be executed based on the control words generated by the compiler. The control words can be provided to a control unit, where the control unit can control the operations of the compute elements within the array of compute elements. Operation of the compute elements can include configuring the compute elements, providing data to the compute elements, routing and ordering results from the compute elements, and so on. In embodiments, the same decompressed control word can be executed on a given cycle across the array of compute elements. The control words can be decompressed to provide control on a per compute element basis, where each control word can be comprised of a plurality of compute element control groups or bunches. One or more control words can be stored in a compressed format within a memory such as a cache. The compression of the control words can greatly reduce storage requirements. In embodiments, the control unit can operate on decompressed control words. The executing operations contained in the control words can include distributed execution of operations. In embodiments, the distributed execution of operations can occur in two or more compute elements within the array of compute elements. Recall that the mapping of the virtual registers can include renaming by the compiler. In embodiments, the renaming can enable the compiler to orchestrate execution of operations using the physical register files.

The system 900 can include a computer program product embodied in a non-transitory computer readable medium for parallel processing, the computer program product comprising code which causes one or more processors to perform operations of: accessing an array of compute elements, wherein each compute element within the array of compute elements is known to a compiler and is coupled to its neighboring compute elements within the array of compute elements; providing control for the array of compute elements on a cycle-by-cycle basis, wherein the control is enabled by a stream of wide control words generated by the compiler, and wherein the control includes a branch; mapping a plurality of compute elements within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression; executing both sides of the branch in the array of compute elements, wherein the executing includes making a branch decision; and suppressing data accesses produced by a branch operation, based on the branch decision and an invalid indication, wherein the invalid indication is propagated among two or more of the compute elements.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for parallel processing comprising:

accessing an array of compute elements, wherein each compute element within the array of compute elements is known to a compiler and is coupled to its neighboring compute elements within the array of compute elements;

providing control for the array of compute elements on a cycle-by-cycle basis, wherein the control is enabled by a stream of wide control words generated by the compiler, and wherein the control includes a branch;

mapping a plurality of compute elements within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression;

executing both sides of the branch in the array of compute elements, wherein the executing includes making a branch decision; and suppressing data accesses produced by a branch operation, based on the branch decision and an invalid indication, wherein the invalid indication is propagated among two or more of the compute elements.

2. The method of claim 1 wherein the mapping includes at least one column of compute elements and one row of compute elements for each simultaneous data access, based on the compiler.

3. The method of claim 2 wherein the row of compute elements comprises a horizontal row of compute elements that receives state information along a horizontal axis.

4. The method of claim 3 wherein compute elements in the horizontal row of compute elements communicate in both horizontal directions.

5. The method of claim 4 wherein the compute elements in the horizontal row of compute elements propagate an invalid indication across the row.

6. The method of claim 2 wherein the column of compute elements comprises a vertical column of compute elements that accesses cache data along a vertical axis.

7. The method of claim 6 wherein compute elements in the vertical column of compute elements communicate in both vertical directions.

8. The method of claim 7 wherein the compute elements in the vertical column of compute elements propagates an invalid indication bit up and down the column.

9. The method of claim 1 wherein a valid indication accompanies each data access address that emerges from the array of compute elements.

10. The method of claim 9 wherein the invalid indication is designated by manipulating the valid indication.

11. The method of claim 10 wherein the invalid indication includes manipulating one or more of a valid bit, a valid data tag, a valid address tag, a nonzero address, and a valid signal.

12. The method of claim 9 wherein each data access address emerging from the array of compute elements represents a potential load or store operation.

13. The method of claim 1 further comprising coupling a data cache to the array of compute elements.

14. The method of claim 13 wherein the data cache is coupled to the array of compute elements in a vertical direction.

15. The method of claim 14 wherein the invalid indication suppresses loading and/or storing data in the data cache.

16. The method of claim 14 wherein a valid indication is a prerequisite for loading and/or storing data in the data cache.

17. The method of claim 16 wherein the suppressing is disabled by resetting the invalid indication.

18. The method of claim 1 wherein the branch decision is made in a compute element within the array of compute elements.

19. The method of claim 18 wherein the branch decision is a result of an operation within the compute element.

20. The method of claim 1 wherein the branch decision is made as a result of control logic supporting the array of compute elements.

21. The method of claim 1 wherein the branch is part of a looping operation.

22. The method of claim 21 wherein the looping operation comprises operations compiled for a pointer chasing software routine.

23. The method of claim 22 wherein the pointer chasing software routine includes a cache performance evaluation.

24. A computer program product embodied in a non-transitory computer readable medium for parallel processing, the computer program product comprising code which causes one or more processors to perform operations of:

accessing an array of compute elements, wherein each compute element within the array of compute elements is known to a compiler and is coupled to its neighboring compute elements within the array of compute elements;

providing control for the array of compute elements on a cycle-by-cycle basis, wherein the control is enabled by a stream of wide control words generated by the compiler, and wherein the control includes a branch;

mapping a plurality of compute elements within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression;

executing both sides of the branch in the array of compute elements, wherein the executing includes making a branch decision; and suppressing data accesses produced by a branch operation, based on the branch decision and an invalid indication, wherein the invalid indication is propagated among two or more of the compute elements.

25. A computer system for parallel processing comprising:

a memory which stores instructions;

one or more processors coupled to the memory, wherein the one or more processors, when executing the instructions which are stored, are configured to:

access an array of compute elements, wherein each compute element within the array of compute elements is known to a compiler and is coupled to its neighboring compute elements within the array of compute elements;

provide control for the array of compute elements on a cycle-by-cycle basis, wherein the control is enabled by a stream of wide control words generated by the compiler, and wherein the control includes a branch;

map a plurality of compute elements within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression;

execute both sides of the branch in the array of compute elements, wherein the executing includes making a branch decision; and suppress data accesses produced by a branch operation, based on the branch decision and an invalid indication, wherein the invalid indication is propagated among two or more of the compute elements.

* * * * *